US012207336B2

(12) United States Patent
Dimou et al.

(10) Patent No.: US 12,207,336 B2
(45) Date of Patent: Jan. 21, 2025

(54) DISCONTINUOUS RECEPTION SIGNALING FOR WIRELESS COMMUNICATIONS SYSTEMS

(71) Applicant: Qualcomm Incorporated, San Diego, CA (US)

(72) Inventors: Konstantinos Dimou, New York City, NY (US); Mahmoud Taherzadeh Boroujeni, San Diego, CA (US); Yan Zhou, San Diego, CA (US); Arumugam Chendamarai Kannan, San Diego, CA (US); Tao Luo, San Diego, CA (US); Peter Gaal, San Diego, CA (US); Juan Montojo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/773,420

(22) PCT Filed: Nov. 13, 2020

(86) PCT No.: PCT/US2020/060503
§ 371 (c)(1),
(2) Date: Apr. 29, 2022

(87) PCT Pub. No.: WO2021/097277
PCT Pub. Date: May 20, 2021

(65) Prior Publication Data
US 2022/0377833 A1    Nov. 24, 2022

(30) Foreign Application Priority Data
Nov. 15, 2019    (GR) .............................. 20190100518

(51) Int. Cl.
H04W 76/20      (2018.01)
H04W 24/08      (2009.01)
H04W 72/12      (2023.01)
H04W 72/1263    (2023.01)
(Continued)

(52) U.S. Cl.
CPC .......... H04W 76/28 (2018.02); H04W 24/08 (2013.01); H04W 72/1263 (2013.01); H04W 80/02 (2013.01)

(58) Field of Classification Search
CPC . H04W 76/28; H04W 72/1263; H04W 72/23; H04W 24/08; H04W 80/02
See application file for complete search history.

(56) References Cited

U.S. PATENT DOCUMENTS

2011/0305215 A1* 12/2011 Hofmann .......... H04W 52/0216
                                                    370/329
2014/0269475 A1    9/2014 Ehsan et al.
(Continued)

FOREIGN PATENT DOCUMENTS

WO    WO-2013169173 A1    11/2013
WO    WO-2019160490 A1    8/2019

OTHER PUBLICATIONS

International Preliminary Report On Patentability—PCT/US2020/060503—The International Bureau of WIPO—Geneva, Switzerland—May 27, 2022.
(Continued)

Primary Examiner — Rasheed Gidado
(74) Attorney, Agent, or Firm — Holland & Hart LLP/Qualcomm

(57) ABSTRACT

Methods and devices for discontinuous reception signaling for wireless communications systems are described. A base station may determine a semi-persistent scheduling (SPS) configuration and a discontinuous reception configuration (DRX) associated with the semi-persistent scheduling (SPS)
(Continued)

configuration for a user equipment (UE). The base station may transmit the SPS configuration to the UE. The SPS configuration may indicate one or more DRX parameters for the DRX configuration. A UE may receive the semi-persistent scheduling configuration from the base station. The UE may identify one or more DRX parameters for the discontinuous reception configuration based on the SPS configuration. The UE may monitor a downlink control channel in accordance with the DRX configuration.

30 Claims, 15 Drawing Sheets

(51) Int. Cl.
*H04W 76/28* (2018.01)
*H04W 80/02* (2009.01)

(56) References Cited

U.S. PATENT DOCUMENTS

| | | | | |
|---|---|---|---|---|
| 2015/0043481 A1* | 2/2015 | Mucke | ............... | H04L 1/1874 370/329 |
| 2015/0085728 A1* | 3/2015 | Majjigi | ............... | H04W 72/23 370/329 |
| 2019/0320491 A1 | 10/2019 | Shukair et al. | | |
| 2021/0360736 A1* | 11/2021 | Chen | ............... | H04W 52/0216 |

OTHER PUBLICATIONS

International Search Report and Written Opinion—PCT/US2020/060503—ISA/EPO—Feb. 16, 2021.

LG Electronics Inc: "DRX Enhancement for Further Power Saving", 3GPP Draft, 3GPP TSG-RAN#105, R2-1901814_DRX Enhancement for Further Power Saving, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019 Feb. 15, 2019 (Feb. 15, 2019), XP051603163, pp. 1-4, Retrieved from the Internet: URL:http://www.3gpp.org/ftp/tsg%5Fran/WG2%5FRL2/TSGR2%5F105/Docs/R2%2O1901814%2Ezip [retrieved on Feb. 15, 2019].

* cited by examiner

1200

DISCONTINUOUS RECEPTION SIGNALING FOR WIRELESS COMMUNICATIONS SYSTEMS

CROSS REFERENCE TO RELATED APPLICATIONS

The present Application is a 371 national stage filing of International PCT Application No. PCT/US2020/060503 by Dimou et al., entitled "DISCONTINUOUS RECEPTION SIGNALING FOR WIRELESS COMMUNICATIONS SYSTEMS," filed Nov. 13, 2020; and claims priority to Greek Patent Application No. 20190100518 by Dimou et al., entitled "DISCONTINUOUS RECEPTION SIGNALING FOR WIRELESS COMMUNICATIONS SYSTEMS," filed Nov. 15, 2019, each of which is assigned to the assignee hereof, and each of which is expressly incorporated by reference in its entirety herein.

FIELD OF TECHNOLOGY

The following relates generally to wireless communications and more specifically to discontinuous reception signaling for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may configure a UE with a discontinuous reception (DRX) configuration to conserve power at the UE. The DRX configuration may enable the UE to monitor resources during an active period of a DRX cycle and to operate in a partial low power state or sleep state during an inactive period of the DRX cycle. In some examples, the base station may also configure the UE with one or more semi-persistent scheduling (SPS) configurations. When multiple SPS configurations are being used for a UE operating in accordance with a DRX configuration, it is possible that the UE may receive traffic (based on an SPS configuration or reconfiguration) during an inactive period of the DRX configuration, which may result in delays, inefficient communications, and relatively high signaling overhead.

SUMMARY

The described techniques relate to improved methods, systems, devices, and apparatuses that support discontinuous reception signaling for wireless communications systems. Generally, the described techniques provide for a base station to jointly configure a user equipment (UE) with a discontinuous reception (DRX) configuration and a corresponding (i.e., linked) semi-persistent scheduling (SPS) configuration. The base station may communicate SPS configuration information to the UE. The base station may also indicate a corresponding DRX configuration or a corresponding set of DRX parameters to the UE. In some examples, the SPS configuration information may include an indication of one or more DRX parameters of a DRX configuration. Additionally or alternatively, the SPS configuration information may include one or more SPS parameters of the SPS configuration, and the UE may determine one or more DRX parameters of the DRX configuration based on the one or more SPS parameters (e.g., due to a linking between the SPS parameters and the DRX parameters). Such techniques may enable more efficient communications, prevent delays associated with receiving new traffic or configuration information during an inactive period of a DRX cycle, and reduce the signaling overhead to configure the UE with an SPS configuration and a set of DRX parameters.

A method of wireless communications at a UE is described. The method may include receiving a first SPS configuration from a base station, identifying one or more DRX parameters of a first DRX configuration based on the first SPS configuration, where the first DRX configuration is associated with the first SPS configuration, and monitoring a downlink control channel in accordance with the first DRX configuration.

An apparatus for wireless communications at a UE is described. The apparatus may include a processor, memory coupled with the processor, and instructions stored in the memory. The instructions may be executable by the processor to cause the apparatus to receive a first SPS configuration from a base station, identify one or more DRX parameters of a first DRX configuration based on the first SPS configuration, where the first DRX configuration is associated with the first SPS configuration, and monitor a downlink control channel in accordance with the first DRX configuration.

Another apparatus for wireless communications at a UE is described. The apparatus may include means for receiving a first SPS configuration from a base station, identifying one or more DRX parameters of a first DRX configuration based on the first SPS configuration, where the first DRX configuration is associated with the first SPS configuration, and monitoring a downlink control channel in accordance with the first DRX configuration.

A non-transitory computer-readable medium storing code for wireless communications at a UE is described. The code may include instructions executable by a processor to receive a first SPS configuration from a base station, identify one or more DRX parameters of a first DRX configuration based on the first SPS configuration, where the first DRX configuration is associated with the first SPS configuration, and monitor a downlink control channel in accordance with the first DRX configuration.

In some examples of the method, apparatuses, and non-transitory computer-readable medium described herein, identifying the one or more DRX parameters may include operations, features, means, or instructions for receiving an indication of the first DRX configuration jointly with receipt of the first SPS configuration.

In some examples of the method, apparatuses, and non-transitory computer-readable medium described herein, identifying the one or more DRX parameters further may include operations, features, means, or instructions for determining a DRX configuration identifier, a DRX parameter group identifier, an association of a SPS identifier with the DRX configuration identifier, or a combination thereof based on the indication of the first DRX configuration.

In some examples of the method, apparatuses, and non-transitory computer-readable medium described herein, identifying the one or more DRX parameters may include operations, features, means, or instructions for identifying one or more SPS parameters of the first SPS configuration, and determining, by the UE, the one or more DRX parameters of the first DRX configuration based on the one or more SPS parameters.

In some examples of the method, apparatuses, and non-transitory computer-readable medium described herein, the one or more SPS parameters includes a periodicity of the first SPS configuration, a starting time of the first SPS configuration, or both.

In some examples of the method, apparatuses, and non-transitory computer-readable medium described herein, the one or more DRX parameters includes one or more offsets of the first DRX configuration, a duration of one or more active periods of the first DRX configuration, or a combination thereof.

Some examples of the method, apparatuses, and non-transitory computer-readable medium described herein may further include operations, features, means, or instructions for receiving a second SPS configuration from the base station, identifying one or more DRX parameters of a second DRX configuration based on the second SPS configuration, where the second DRX configuration may be associated with the second SPS configuration, and monitoring the downlink control channel in accordance with the second DRX configuration.

In some examples of the method, apparatuses, and non-transitory computer-readable medium described herein, identifying the one or more DRX parameters may include operations, features, means, or instructions for receiving, from the base station, downlink control information indicating the one or more DRX parameters.

In some examples of the method, apparatuses, and non-transitory computer-readable medium described herein, the downlink control information includes the first SPS configuration.

In some examples of the method, apparatuses, and non-transitory computer-readable medium described herein, identifying the one or more DRX parameters may include operations, features, means, or instructions for receiving, from the base station, medium access control (MAC) control element (CE) signaling that indicates the one or more DRX parameters.

In some examples of the method, apparatuses, and non-transitory computer-readable medium described herein, the first DRX configuration includes one or more active periods of the UE that overlap with one or more resource assignments of the first SPS configuration.

In some examples of the method, apparatuses, and non-transitory computer-readable medium described herein, monitoring a downlink control channel in accordance with the first DRX configuration further may include operations, features, means, or instructions for monitoring the downlink control channel during one or more active periods of a cycle of the first DRX configuration, and entering a low power state after the one or more active periods of the cycle.

A method of wireless communications at a base station is described. The method may include determining a first SPS configuration for a UE, determining a first DRX configuration associated with the first SPS configuration, and transmitting the first SPS configuration to the UE, the first SPS configuration being indicative of one or more DRX parameters of the first DRX configuration.

An apparatus for wireless communications at a base station is described. The apparatus may include a processor, memory coupled with the processor, and instructions stored in the memory. The instructions may be executable by the processor to cause the apparatus to determine a first SPS configuration for a UE, determine a first DRX configuration associated with the first SPS configuration, and transmit the first SPS configuration to the UE, the first SPS configuration being indicative of one or more DRX parameters of the first DRX configuration.

Another apparatus for wireless communications at a base station is described. The apparatus may include means for determining a first SPS configuration for a UE, determining a first DRX configuration associated with the first SPS configuration, and transmitting the first SPS configuration to the UE, the first SPS configuration being indicative of one or more DRX parameters of the first DRX configuration.

A non-transitory computer-readable medium storing code for wireless communications at a base station is described. The code may include instructions executable by a processor to determine a first SPS configuration for a UE, determine a first DRX configuration associated with the first SPS configuration, and transmit the first SPS configuration to the UE, the first SPS configuration being indicative of one or more DRX parameters of the first DRX configuration.

In some examples of the method, apparatuses, and non-transitory computer-readable medium described herein, transmitting the first SPS configuration to the UE may include operations, features, means, or instructions for transmitting an indication of the first DRX configuration jointly with the transmission of the first SPS configuration.

In some examples of the method, apparatuses, and non-transitory computer-readable medium described herein, the one or more DRX parameters includes one or more offsets of the first DRX configuration, a duration of one or more active periods of the first DRX configuration, or a combination thereof.

Some examples of the method, apparatuses, and non-transitory computer-readable medium described herein may further include operations, features, means, or instructions for identifying one or more SPS parameters of the first SPS configuration.

In some examples of the method, apparatuses, and non-transitory computer-readable medium described herein, the one or more SPS parameters include a periodicity of the first SPS configuration, a starting time of the first SPS configuration, or both.

In some examples of the method, apparatuses, and non-transitory computer-readable medium described herein, the one or more DRX parameters correspond to the one or more SPS parameters.

Some examples of the method, apparatuses, and non-transitory computer-readable medium described herein may further include operations, features, means, or instructions for determining a second SPS configuration for the UE, determining a second DRX configuration associated with the second SPS configuration, and transmitting the second SPS configuration to the UE, the second SPS configuration being indicative of one or more DRX parameters of the second DRX configuration.

Some examples of the method, apparatuses, and non-transitory computer-readable medium described herein may further include operations, features, means, or instructions for transmitting, to the UE, downlink control information indicating the one or more DRX parameters.

In some examples of the method, apparatuses, and non-transitory computer-readable medium described herein, the downlink control information includes the first SPS configuration.

Some examples of the method, apparatuses, and non-transitory computer-readable medium described herein may further include operations, features, means, or instructions for transmitting, to the UE, MAC-CE signaling indicating the one or more DRX parameters.

Some examples of the method, apparatuses, and non-transitory computer-readable medium described herein may further include operations, features, means, or instructions for transmitting, to the UE, one or more messages via resource blocks associated with the first SPS configuration, where the resource blocks overlap with one or more active periods of the first DRX configuration.

DETAILED DESCRIPTION

Figure 1:
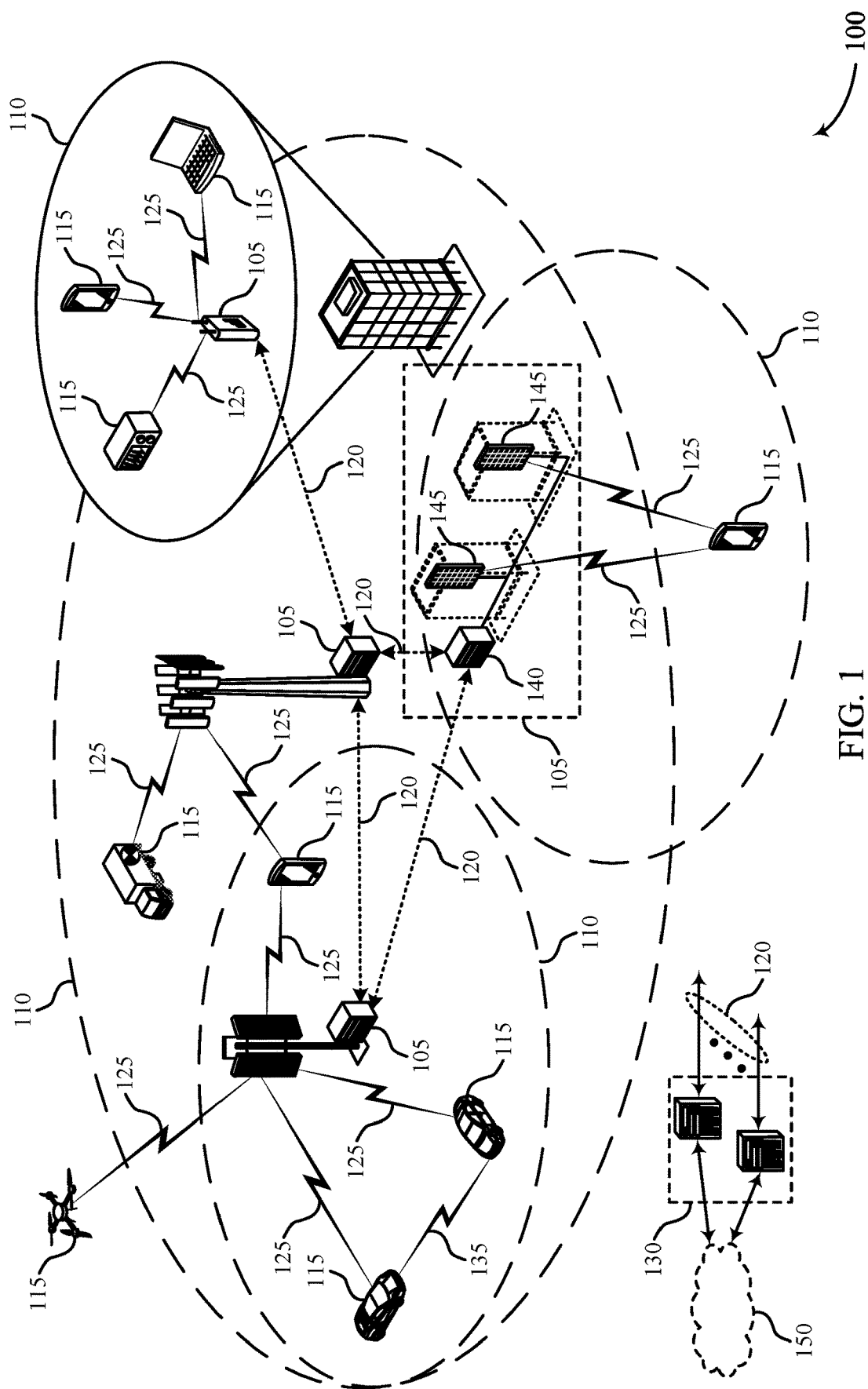
FIG. 1 illustrates an example of a system for wireless communications that supports discontinuous reception signaling for wireless communications systems in accordance with aspects of the present disclosure.

In some wireless communications systems, a user equipment (UE) may receive a discontinuous reception (DRX) configuration to conserve power at the UE. For example, the UE may be configured with DRX parameters corresponding to a DRX cycle. The UE may monitor a downlink control channel during an active period of the DRX cycle. The UE may limit power consumption (e.g., operate in a partial low power state) by refraining from monitoring a downlink control channel during an inactive period of the DRX cycle. In some examples, the UE may determine that it is not scheduled to transmit or receive for the rest of the DRX cycle. In such examples, the UE may transition into a sleep mode and may not communicate uplink data, downlink data, or control information until the next DRX cycle.

The base station may also configure the UE with a semi-persistent scheduling (SPS) configuration. The UE may receive or transmit SPS communications while operating with a DRX cycle. For example, the UE may monitor a downlink control channel for an initial active period at the beginning of the DRX cycle. In some cases, the UE may identify SPS resources, receive SPS messages on a downlink shared channel, and transmit feedback for the SPS messages without receiving additional downlink grants or control information. However, if SPS messages are successfully received in the initial active period, the UE may refrain from monitoring for downlink control information outside of the initial active period. While turning off downlink control channel monitoring in the low power state may reduce power consumption at the UE, such techniques may also lead to some delays and communications errors. For example, a base station may have multiple SPS configurations that are being used for communications with the UE. While some of the SPS configurations could include transmissions to the UE during an active period of the UE DRX configuration, other transmissions arising from SPS configurations could occur during the inactive periods of the DRX configuration for the UE. As a result, the UE may not be able to receive the transmissions arising from multiple SPS configurations.

The techniques described herein may support a linking between SPS configurations and DRX configurations in order to provide for more efficient and reliable communications. For example, an SPS configuration of a set of SPS configurations may correspond (e.g., have a one to one mapping) with a DRX configuration or a set of DRX parameters. Such a linking may provide for increased overlap between active periods of the DRX configuration and SPS resources of the SPS configuration, which may result in a reduced chance of delays and enable dynamic configuration of a UE with more efficient resource allocations.

Additionally or alternatively, the described techniques may support enhanced signaling of the DRX parameters of a DRX configuration. For example, the base station may indicate a DRX configuration or a set of DRX parameters to the UE. In some examples, the base station may indicate the DRX parameters via layer 1 signaling (e.g., downlink control information (DCI) or medium access control (MAC) control elements (CEs)). In some examples, the DRX parameters may be associated with an SPS configuration. In such examples, the base station may jointly configure the UE with an SPS configuration and an associated DRX configuration (or an associated set of DRX parameters). For example, the base station may transmit an SPS configuration to the UE. The base station may also indicate an associated DRX configuration or an associated set of DRX parameters to the UE, for example, via layer 1 signaling. In some examples, the SPS configuration may include an indication of one or more DRX parameters of the DRX configuration. The indication may include an a DRX configuration identifier, a DRX parameter group identifier, an association between the SPS configuration and a DRX configuration, or a combination thereof. Additionally or alternatively, the SPS configuration may include one or more SPS parameters. The UE may determine one or more DRX parameters of the DRX configuration based on the one or more SPS parameters (e.g., due to a linking between the SPS parameters and the DRX parameters). Such signaling may reduce the signaling overhead associated with configuring the UE with DRX parameters associated with one of multiple SPS configurations.

Aspects of the disclosure are initially described in the context of wireless communications systems. Aspects of the disclosure are further illustrated by and described with reference to process flows, apparatus diagrams, system diagrams, and flowcharts that relate to discontinuous reception signaling for wireless communications systems.

FIG. 1 illustrates an example of a wireless communications system 100 that supports discontinuous reception signaling for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured with a DRX configuration. For example, the UE 115 may be configured with a DRX cycle including an active period and an inactive period. The UE 115 may communicate with base station 105-a using full power during the active period. For example, UE 115-a may not have capabilities or radio frequency (RF) functionalities turned off while in the active period 210. In some cases, the active period may occur at the beginning of the DRX cycle. A duration for the DRX cycle (e.g., including the inactive and active periods) may be configurable and span one or more slots. For example, the DRX cycle may be 5 milliseconds, 10 milliseconds, 20 milliseconds, etc.

If a UE 115 receives downlink control signaling which indicates a new uplink or downlink transmission for the UE 115, then the UE 115 may activate a DRX inactivity timer. The UE 115 may remain active (e.g., not in a low power or sleep mode) while the DRX inactivity timer counts down. In some cases, the duration of the DRX inactivity timer may be based on a round trip time (RTT) delay for communications between the UE 115 and the base station 105 and a number of HARQ processes at the UE 115. While the DRX inactivity timer is active, the UE 115 may receive downlink shared channel transmissions or be scheduled for an uplink shared channel transmission. The UE 115 may then transmit or receive feedback for the uplink or downlink transmission.

In an example, a UE 115 may receive DCI on a physical downlink control channel (PDCCH) during the active period, and the DCI may schedule the UE 115 for a downlink shared channel message on physical downlink shared channel (PDSCH) resources. The UE 115 may activate the DRX inactivity timer and monitor the PDSCH resources. If the UE 115 successfully receives the shared channel message, the UE 115 may transmit an acknowledgment (e.g., an ACK) on an uplink control channel (e.g., a physical uplink control channel (PUCCH)) and activate a downlink HARQ RTT timer. The downlink HARQ RTT timer may correspond to the minimum duration before a downlink assignment for HARQ retransmission is expected at the MAC entity of the UE 115. Once the downlink HARQ RTT timer expires, the UE 115 may enter the inactive period.

If a UE 115 is scheduled for a downlink shared channel message which is unsuccessfully received, the UE 115 may transmit a negative acknowledgment (NACK) to the scheduling base station 105 and start the downlink HARQ RTT timer. Once the downlink HARQ RTT timer expires, the UE 115 may begin a downlink DRX retransmission timer, which may correspond to the maximum duration until a downlink retransmission is received. While the downlink DRX retransmission timer is counting down, the UE 115 may receive another DCI transmission scheduling a retransmission downlink shared channel message on PDSCH resources. If the UE 115 successfully receives the retransmission, the UE 115 may start the downlink HARQ RTT timer and enter the inactive period once the downlink HARQ RTT timer expires.

A UE 115 may be configured with an SPS configuration. For example, the UE 115 may be scheduled by the base station 105-a for SPS communications. SPS communications may be supported to reduce scheduling overhead. In some examples, a base station 105 may configure the UE 115 with multiple SPS configurations. Each SPS configuration may be associated with semi-periodic resources, and a base station 105 may transmit downlink shared channel messages to the UE 115 on the semi-periodic resources.

Each SPS configuration may have a set periodicity and an offset within a start of a DRX cycle. For example, in a DRX cycle with a 5 millisecond periodicity, a first SPS configuration may have a periodicity of 2 milliseconds and PDSCH resources may occur 0.5 ms after the beginning of the DRX cycle. A second SPS configuration may have a periodicity of 2 milliseconds, and PDSCH resources for the second SPS configuration may occur 1.2 milliseconds after the start of the DRX cycle. A third SPS configuration may have a periodicity of 10 milliseconds, and PDSCH resources may be scheduled for 3.8 ms after the start of the DRX cycle. In other examples, SPS configurations may have different offsets from the beginning of the DRX cycle, different periodicities, etc., and the UE 115 may have a different number of SPS configurations.

A UE 115 may monitor for SPS messages on PDSCH while in a low power or partial sleep mode. The UE 115 may also transmit feedback for the SPS messages while in the partial sleep mode. In some cases, the UE 115 does not successfully receive an SPS message, and the UE 115 may send a NACK for the SPS message. After sending the NACK, the UE 115 may exit the partial sleep mode and re-enter the active mode to monitor PDCCH and receive scheduling information a re-transmission for the SPS message. In some cases, the DCI scheduling the re-transmission may indicate new resource information (e.g., a new beam, a modulation coding scheme (MCS), etc.) for one or more of the SPS configurations.

While turning off PDCCH monitoring in the low power mode may reduce power consumption at a UE 115, some conventional techniques may also lead to some delays and communications errors. For example, a base station 105 may have new traffic for a UE 115, but the UE 115 may be in the low power mode. Therefore, the UE 115 cannot receive PDCCH carrying DCI to indicate the new traffic until the beginning of the next DRX cycle and active period. If the new traffic is high priority or high urgency, such as URLLC, the delay may be catastrophic for the UE 115. In another example, the UE 115 may enter the low power mode with a non-optimal resource allocation, quasi co-location (QCL) mapping or assumption, etc., and the UE 115 may have better performance with a different beam, MCS, PRB, etc. However, the UE 115 may not be able to receive downlink control channel signaling which indicates a modification for these parameters (e.g., an SPS reconfiguration to another SPS configuration) until the beginning of the next active period.

UEs 115 and base station 105 implementing the techniques described herein may support joint signaling of SPS configurations and DRX configurations in order to provide for more efficient and reliable communications. For example, an SPS configuration of a set of SPS configurations may correspond (e.g., have a one to one mapping) with a DRX configuration or a set of DRX parameters, which may provide for increased overlap between active periods of the DRX configuration and SPS resources of the SPS configurations.

The described techniques may also support enhanced signaling of the DRX parameters of a DRX configuration. Such enhanced signaling may reduce the signaling overhead in the wireless communications system 100 when the number of SPS configurations is relatively high. For example, the UE 115 may be signaled updated DRX parameters each time the UE 115 is reconfigured with a different SPS configuration. Accordingly, a base station 105 may jointly configure a UE with an SPS configuration and an associated DRX configuration (or an associated set of DRX parameters) in order to conserve resources. For example, the base station 105 may transmit an SPS configuration to the UE 115. The base station may also indicate an associated DRX configuration or an associated set of DRX parameters to the UE 115, for example, via layer 1 signaling (e.g., DCI signaled over PDCCH or MAC-CEs). In some examples, the SPS configuration may include an indication of one or more DRX parameters of the DRX configuration. Additionally or alternatively, the SPS configuration may include one or more SPS parameters. The UE 115 may determine one or more DRX parameters of the DRX configuration based on the one or more SPS parameters (e.g., due to a linking between the SPS parameters and the DRX parameters).

Figure 2:
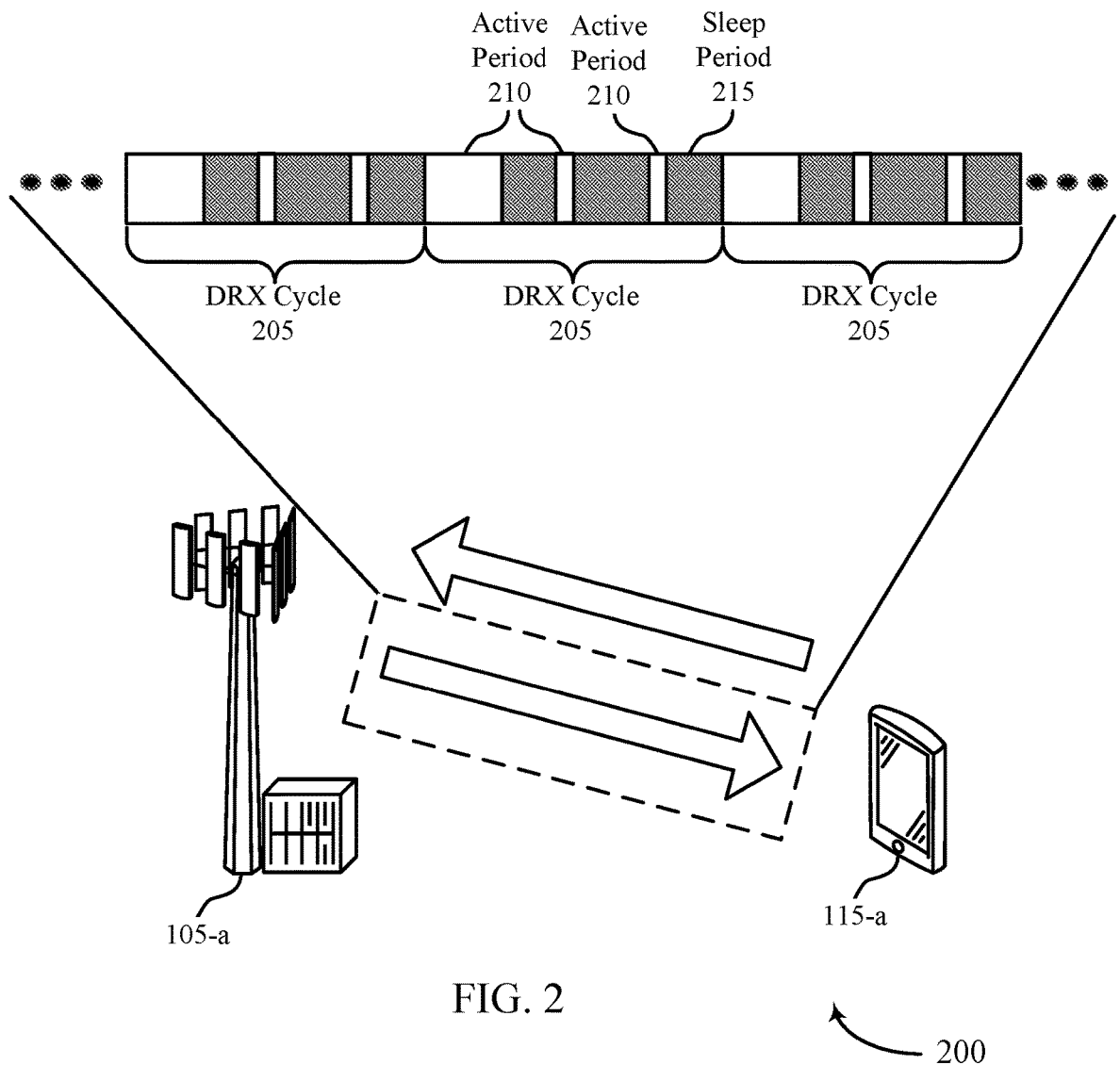
FIG. 2 illustrates an example of a wireless communications system that supports discontinuous reception signaling for wireless communications systems in accordance with aspects of the present disclosure.

FIG. 2 illustrates an example of a wireless communications system 200 that supports discontinuous reception signaling for wireless communications systems in accordance with aspects of the present disclosure. In some examples, wireless communications system 200 may implement aspects of wireless communication system 100. Wireless communications system 200 may include UE 115-*a* and base station 105-*a*, which may be respective examples of a UE 115 and a base station 105 described with reference to FIG. 1.

The UE 115-*a* may be configured with a DRX configuration. For example, the UE 115-*a* may be configured with one or more DRX cycles 205 in accordance with the DRX configuration. A DRX cycle 205 may include active periods 210 and sleep periods 215. In some cases, the sleep periods 215 may be referred to an inactive period or include aspects of a partial sleep period. When in an active period 210, the UE 115-*a* may monitor PDCCH for downlink control channel signaling. When in a sleep period 215, the UE 115-*a* may refrain from monitoring PDCCH to reduce power consumption at the UE 115-*a*. In some cases, the sleep period 215 may include periods for a sleep mode, periods for a partial sleep mode, or both. While in the partial sleep mode, the UE 115-*a* may refrain from monitoring PDCCH. During the sleep mode, the UE 115-*a* may turn off additional communications functions. For example, the UE 115-*a* may turn off radio frequency capabilities such that the UE 115-*a* does not transmit or monitor for incoming transmissions. For example, when the UE 115-*a* does not have any further pending communications in the DRX cycle 205, the UE 115-*a* may disable some radio functionalities and transition into the sleep mode.

The UE 115-*a* may also support one or more SPS configurations. For example, the UE 115-*a* may have multiple possible SPS configurations, each of which may have a different periodicity and offset from the beginning (i.e., start) of the DRX cycle 205. The base station 105-*a* may configure the UE 115-*a* with an SPS configuration, an SPS reconfiguration (e.g., reconfigure the UE 115-*a* with a new SPS configuration and associated resource assignments via DCI), or an SPS activation. For example, the base station 105-*a* may indicate an SPS configuration information element (e.g., SPS-Config) to the UE 115-*a*. The SPS configuration information element may be used to configure downlink semi-persistent communications (e.g., downlink SPS may be configured for at most one cell in a cell group). Such an information element may include one or more SPS parameters of the SPS configuration. For example, the one or more SPS parameters may include one or more allocated resources for SPS communications, an assignment starting time, a periodicity of the SPS communications (e.g., 10 ms, 20 ms, 32 ms, etc.), a number of HARQ processes (e.g., an integer from 1 to 8), resources associated with a PUCCH (e.g., a PUCCH resource identifier), an MCS table (e.g., indicating QAM64, among other examples of MCS), among other examples of SPS parameters. In some examples, the base station 105-*a* may reconfigure an SPS configuration of the UE 115-*a* by indicating that the UE 115-*a* should perform a resource modification, such as a beam change, a physical resource block (PRB) change, an MCS change, a QCL association change, or any combination thereof.

The UE 115-*a* may receive SPS messages (e.g., on a downlink shared channel) and transmit feedback while operating in the partial sleep mode in the sleep period 215. If the UE 115-*a* sends feedback including a NACK for an SPS message, the UE 115-*a* may enter the active mode to monitor for PDCCH which may schedule a re-transmission of the SPS message. In some examples, SPS messages may be successfully received in the initial active period and the UE 115-*a* may refrain from monitoring for PDCCH outside of the initial active period 210. While turning off downlink control channel monitoring in the low power state may reduce power consumption at the UE 115-*a*, such techniques may also lead to some delays and communications errors. For example, the base station 105-*a* may have new traffic for the UE 115-*a*, but the UE 115-*a* may be in the low power mode (e.g., in between active periods 210 or in the sleep period 215). Therefore, the UE 115-*a* may not receive a grant for the new traffic until the beginning of the next DRX cycle 205. If the new traffic is high priority or high urgency (e.g., URLLC traffic), such a delay may be catastrophic for the UE 115-*a*. In another example, the UE 115-*a* may enter the low power mode with a relatively inefficient resource allocation, and the UE 115-*a* may have better performance with a different resource allocation. However, the UE may not be able to receive DCI indicating a modification of the resource allocation (e.g., an SPS reconfiguration) until the beginning of the next active period 210.

An SPS configuration of the UE 115-*a* may be linked to a DRX configuration of the UE 115-*a* in order to reduce the probability of delays in inefficient communications. For example, each of the SPS configurations of the UE 115-*a* may include a corresponding DRX configuration or a corresponding set of DRX parameters. In other words, there may be a one to one mapping between each possible SPS configuration and each DRX configuration or set of DRX parameters. Such a linking may provide for increased overlap between active periods 210 of the DRX cycle 205 and SPS messages of a respective SPS configuration. For example, the DRX parameters may set one or more activity or inactivity timers of the DRX cycle 205, a number of active periods 210 of the DRX cycle 205, one or more offsets of the active periods 210 of the DRX cycle 205, etc., such that any high priority traffic or SPS reconfiguration messages (e.g., transmitted in accordance with a linked SPS configuration or set of SPS parameters) may be received during an active period 210.

In some examples, the base station 105-*a* may configure the UE 115-*a* with one or more DRX parameters associated with an SPS configuration via layer 2 signaling (e.g., via RRC messaging). For example, the base station 105-*a* may signal one or more information elements (e.g., a set of DRX-Config information elements where each element is defined per SPS configuration) or the base station 105-*a* may signal multiple sets of DRX parameters (e.g., when a single DRX configuration is associated with multiple SPS configurations). However, such signaling may result in relatively high signaling overhead.

Accordingly, the base station 105-*a* or the UE 115-*a* may employ the enhanced signaling techniques described herein to reduce the signaling overhead. For example, the base station 105-*a* may jointly configure the UE 115-*a* with an SPS configuration and a corresponding DRX configuration or a corresponding set of DRX parameters to reduce the signaling overhead. The base station 105-a may transmit an SPS configuration (e.g., of a set of SPS configurations) to the UE 115-a. The base station 105-a may also indicate an associated DRX configuration or an associated set of DRX parameters to the UE 115-a.

In some examples, the base station 105-a may explicitly indicate one or more DRX parameters corresponding to an SPS configuration via layer 1 signaling (e.g., DCI or MAC-CEs). In some examples, the base station 105-a may indicate the one or more DRX parameters independent of an SPS configuration, reconfiguration, or activation. For example, the base station 105-a may signal one or more DRX parameters (e.g., a DRX configuration identifier, a DRX parameter group identifier, DRX timers, DRX offsets, DRX starts, among other examples) using DCI even if the DCI does not include an SPS configuration or reconfiguration. Such examples may enable the base station 105-a to configure or reconfigure DRX parameters independent of whether the DRX configuration is linked (i.e., corresponds) to an SPS configuration at the device. Additionally or alternatively, the base station 105-a may explicitly indicate the one or more DRX parameters to the UE 115-a jointly with an SPS configuration or reconfiguration (e.g., using DCI). For example, the base station 105-a may configure the UE 115-a with an SPS configuration (e.g., an SPS-Config information element) and the SPS configuration may include an indication of the DRX configuration or the one or more DRX parameters. The indication of the DRX parameters may be included in an SPS configuration information element. As an example, the indication may include a DRX configuration identifier (e.g., a DRX Config ID), a DRX parameters group identifier (e.g., DRX ParametersGroup ID), an association between an SPS configuration identifier and the DRX configuration identifier, among other examples.

In some other examples, the base station 105-a may implicitly indicate the one or more DRX parameters corresponding to the SPS configuration. For example, the base station 105-a may signal the SPS configuration or reconfiguration to the UE 115-a and the UE 115-a may identify one or more SPS parameters of the SPS configuration based on the signaling. The UE 115-a may determine one or more DRX parameters of a corresponding DRX configuration based on the SPS parameters (e.g., in accordance with pre-configured relationships or settings between the SPS parameters and the DRX parameters). As an illustrative example, the UE 115-a may identify DRX offsets, timers, configurations, and the like based at least in part on an SPS periodicity parameter and an SPS start parameter. Table 1 may illustrate some possible example settings and associations between SPS parameters and DRX parameters.

TABLE 1

| DRX Parameter | SPS Parameter | Setting | Comments |
| --- | --- | --- | --- |
| drx-LongCycleStartOffset | Periodicity | drx-LongCycleStartOffset = Periodicity | Extend range of values and increase granularity at both parameters |
| shortDRX | Periodicity | shortDRX = Periodicity | (If short DRX cycle configured) Extend range of values and increase granularity at both parameters |
| Drx-ShortCycleTimer | — | — | Parameter may be the same or different per SPS configuration |
| Drx-SlotOffset | SPS Start | Drx-SlotOffset = SPS Start | — |

In some examples, the UE 115-a may determine some DRX parameters of the DRX configuration in accordance with a defined setting and determine some DRX parameters based on signaling from the base station 105-a (e.g., explicit indication of DRX parameters via layer 1 or layer 2 signaling).

Figure 3:
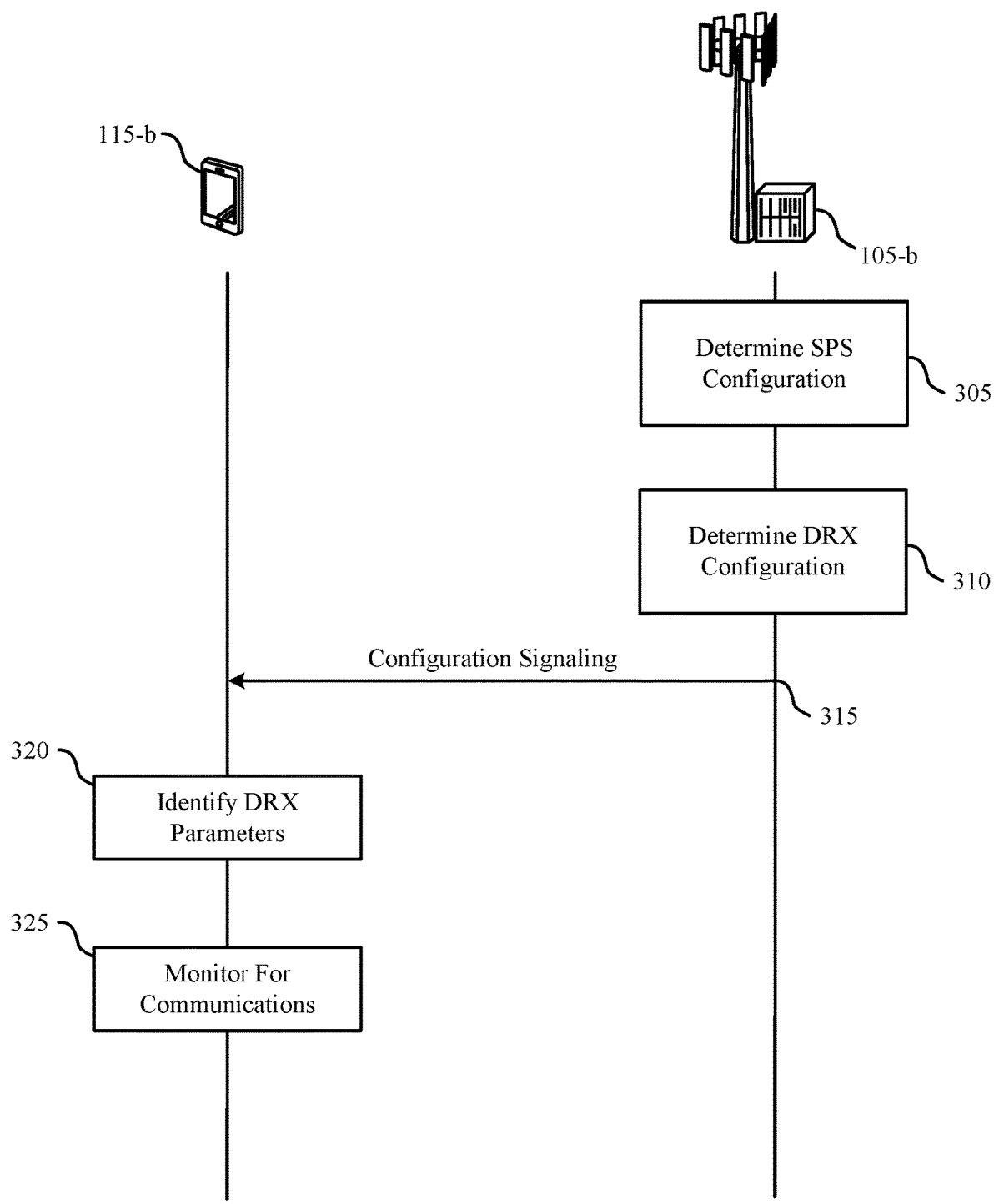
FIG. 3 illustrates an example of a process flow that supports discontinuous reception signaling for wireless communications systems in accordance with aspects of the present disclosure.

FIG. 3 illustrates an example of a process flow 300 that supports discontinuous reception signaling for wireless communications systems in accordance with aspects of the present disclosure. In some examples, process flow 300 may implement aspects of wireless communications systems 100 and/or 200. Process flow 300 includes UE 115-b and base station 105-b, which may be respective examples of a UE 115 and a base station 105 as described with reference to FIG. 1.

At 305, base station 105-b may determine an SPS configuration (e.g., one of multiple SPS configurations as described with reference to FIGS. 1 and 2). The SPS configuration may include one or more SPS parameters. The base station 105-b may configure the UE 115-b with the SPS configuration for subsequent SPS communications.

At 310, the base station 105-b may determine a DRX configuration of the UE 115-b. For example, the base station 105-b may identify one or more DRX parameters (e.g., of a DRX configuration) corresponding to the determined SPS configuration. In other words, the base station 105-b may identify a set of DRX parameters that are linked to an SPS configuration.

At 315, the base station 105-b may transmit configuration signaling to the UE 115-b. For example, the base station 105-b may configure the UE 115-b with the determined SPS configuration as described herein with reference to FIGS. 1 and 2. The base station 105-b may jointly configure the UE 115-b with the determined DRX configuration as described herein with reference to FIGS. 1 and 2. For example, the base station 105-b may signal one or more DRX parameters via layer 1 signaling (e.g., DCI) independent of whether the DRX parameters are linked (i.e., correspond) to the determined SPS configuration. Additionally or alternatively, the base station 105-b may signal one or more DRX parameters that correspond to a determined SPS configuration as described herein. For example, the configuration signaling may include explicitly signaling the one or more DRX parameters (e.g., via DCI that includes the SPS configuration), implicitly signaling the one or more DRX parameters (e.g., via defined settings between parameters of the SPS configuration and the DRX parameters), or a combination thereof.

At 320, the UE 115-b may identify DRX parameters based on the configuration signaling. For example, the UE 115-b may receive or determine one or more DRX parameters of the DRX configuration as described herein with reference to FIG. 2. At 325, the UE 115-b may monitor for communications in accordance with the DRX configuration and SPS configuration. For example, the UE 115-b may monitor a downlink control channel during active periods of the DRX configuration (e.g., for SPS messages transmitted via scheduled resources of the SPS configuration).

Figure 4:
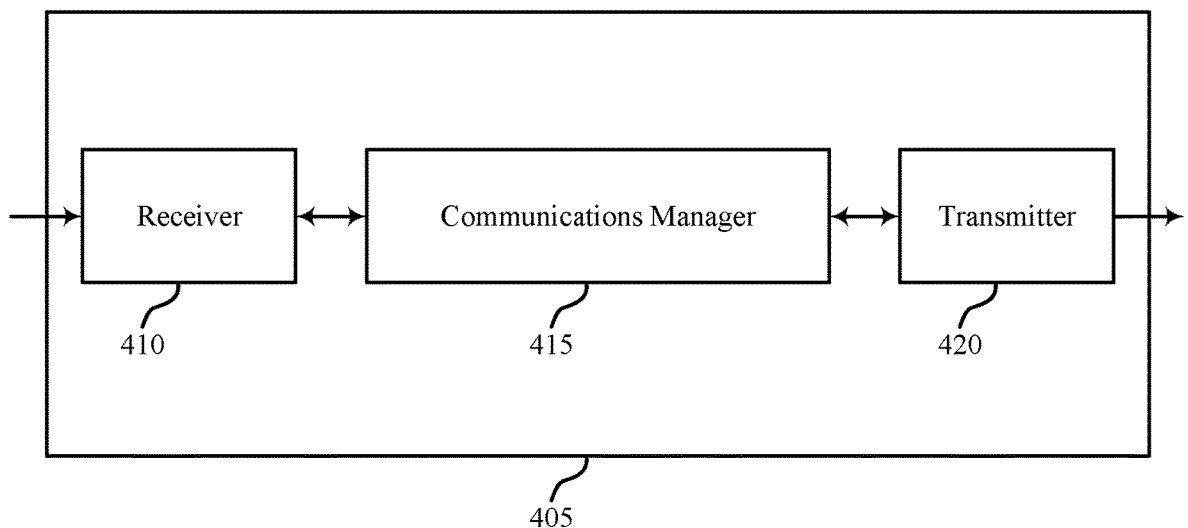
FIGS. 4 and 5 show block diagrams of devices that support discontinuous reception signaling for wireless communications systems in accordance with aspects of the present disclosure.

FIG. 4 shows a block diagram 400 of a device 405 that supports discontinuous reception signaling for wireless communications systems in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to discontinuous reception signaling for wireless communications systems, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a first SPS configuration from a base station, identify one or more DRX parameters of a first DRX configuration based on the first SPS configuration, where the first DRX configuration is associated with the first SPS configuration, and monitor a downlink control channel in accordance with the first DRX configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 415 as described herein may be implemented to realize one or more potential advantages. One implementation may enable a wireless device, such as a UE 115 or a base station 105, to jointly indicate one or more SPS configurations (e.g., a set of SPS parameters) and one or more corresponding DRX configurations (e.g., one or more linked DRX parameters). By linking SPS configurations with an associated DRX configuration or an associated set of DRX parameters (e.g., DRX timers, offsets, starts, etc.), the chance of delays and inefficient communications may be mitigated due to an alignment of active periods of the DRX configuration with new traffic or SPS configurations (or reconfigurations) transmitted to the UE 115, among other examples of advantages.

Based on implementing the signaling as described herein, a processor of the UE 115 (e.g., a processor controlling the receiver 410, the communications manager 415, the transmitter 420, or a combination thereof) and/or a base station 105 may reduce signaling overhead associated with configuring the UE 115 with an SPS configuration and a corresponding DRX configuration for a relatively high number of SPS configurations. For example, the signaling may include transmitting an indication of a linked DRX configuration along with or independent of an SPS configuration. Additionally or alternatively, the signaling may include signaling SPS parameters of an SPS configuration and the processor of the UE 115 may be operable to determine one or more corresponding DRX parameters based on the SPS parameters. Therefore, the UE 115 (e.g., a processor of the UE 115) and/or the base station 105 may realize reduced signaling overhead.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
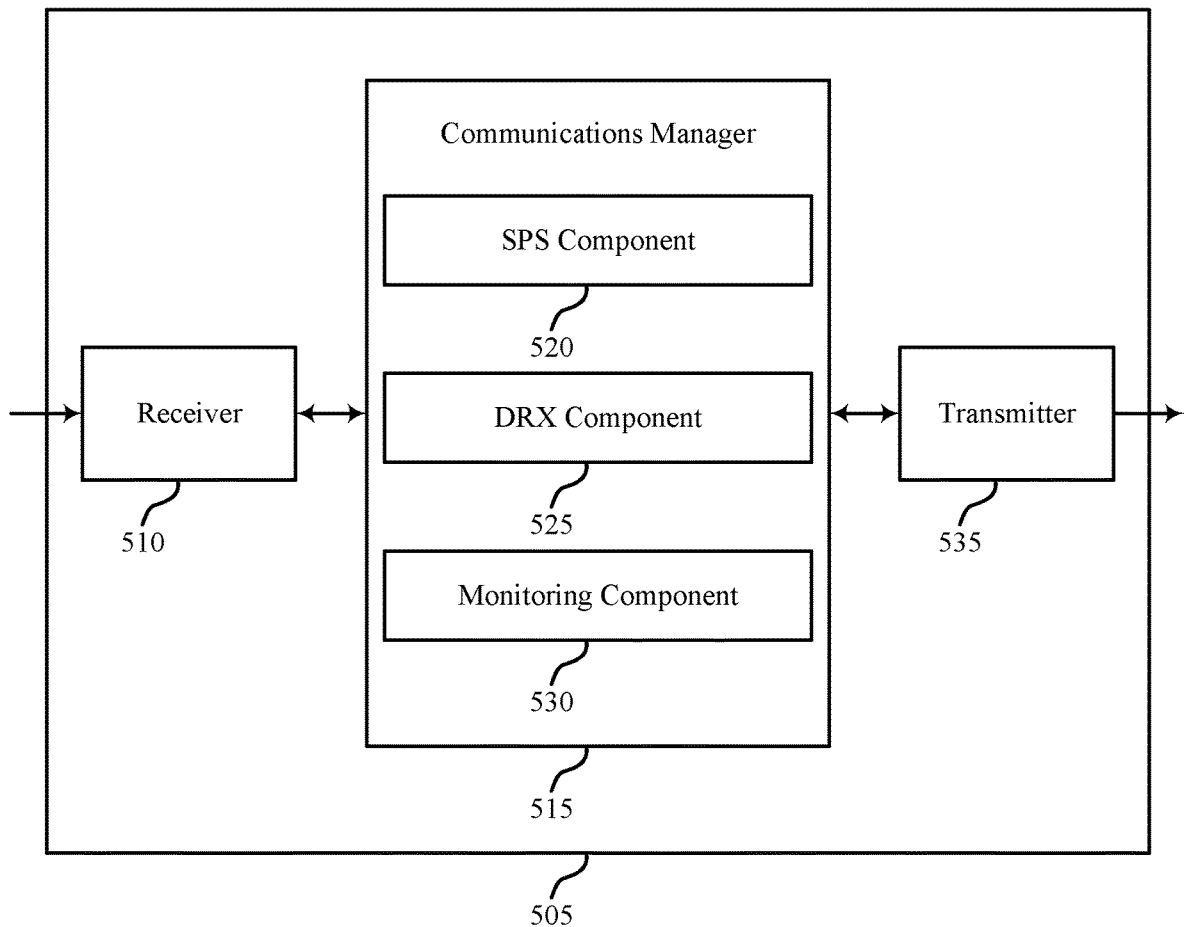

FIG. 5 shows a block diagram 500 of a device 505 that supports discontinuous reception signaling for wireless communications systems in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to DRX signaling for wireless communications systems, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a SPS component 520, a DRX component 525, and a monitoring component 530. The communications manager 515 may be an example of aspects of the communications manager 710 described herein.

The SPS component 520 may receive a first SPS configuration from a base station.

The DRX component 525 may identify one or more DRX parameters of a first DRX configuration based on the first SPS configuration, where the first DRX configuration is associated with the first SPS configuration.

The monitoring component 530 may monitor a downlink control channel in accordance with the first DRX configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
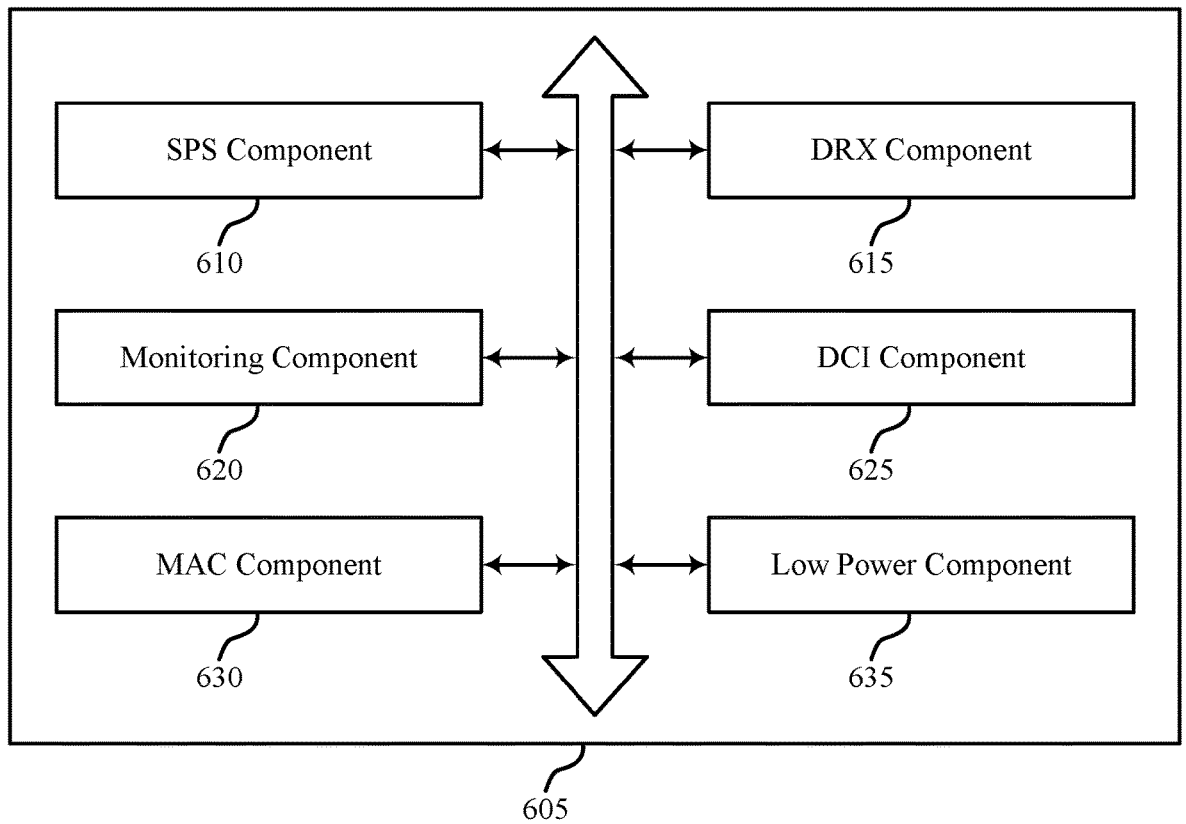
FIG. 6 shows a block diagram of a communications manager that supports discontinuous reception signaling for wireless communications systems in accordance with aspects of the present disclosure.

FIG. 6 shows a block diagram 600 of a communications manager 605 that supports discontinuous reception signaling for wireless communications systems in accordance with aspects of the present disclosure. The communications manager 605 may be an example of aspects of a communications manager 415, a communications manager 515, or a communications manager 710 described herein. The communications manager 605 may include a SPS component 610, a DRX component 615, a monitoring component 620, a DCI component 625, a MAC component 630, and a low power component 635. Each of these modules may communicate, directly or indirectly, with one another (e.g., via one or more buses).

The SPS component 610 may receive a first SPS configuration from a base station. In some examples, the SPS component 610 may identify one or more SPS parameters of the first SPS configuration. In some examples, the SPS component 610 may receive a second SPS configuration from the base station.

The DRX component 615 may identify one or more DRX parameters of a first DRX configuration based on the first SPS configuration, where the first DRX configuration is associated with the first SPS configuration. In some examples, the DRX component 615 may receive an indication of the first DRX configuration jointly with receipt of the first SPS configuration. In some examples, the DRX component 615 may determine a DRX configuration identifier, a DRX parameter group identifier, an association of a SPS identifier with the DRX configuration identifier, or a combination thereof based on the indication of the first DRX configuration. In some examples, the DRX component 615 may determine, by the UE, the one or more DRX parameters of the first DRX configuration based on the one or more SPS parameters.

In some examples, the DRX component 615 may identify one or more DRX parameters of a second DRX configuration based on the second SPS configuration, where the second DRX configuration is associated with the second SPS configuration. In some cases, the one or more SPS parameters includes a periodicity of the first SPS configuration, a starting time of the first SPS configuration, or both. In some cases, the one or more DRX parameters includes one or more offsets of the first DRX configuration, a duration of one or more active periods of the first DRX configuration, or a combination thereof.

The monitoring component 620 may monitor a downlink control channel in accordance with the first DRX configuration. In some examples, the monitoring component 620 may monitor the downlink control channel in accordance with the second DRX configuration. In some examples, the monitoring component 620 may monitor the downlink control channel during one or more active periods of a cycle of the first DRX configuration. In some cases, the first DRX configuration includes one or more active periods of the UE that overlap with one or more resource assignments of the first SPS configuration.

The DCI component 625 may receive, from the base station, downlink control information indicating the one or more DRX parameters. In some cases, the downlink control information includes the first SPS configuration.

The MAC component 630 may receive, from the base station, medium access control (MAC) control element signaling that indicates the one or more DRX parameters.

The low power component 635 may enter a low power state after the one or more active periods of the cycle.

Figure 7:
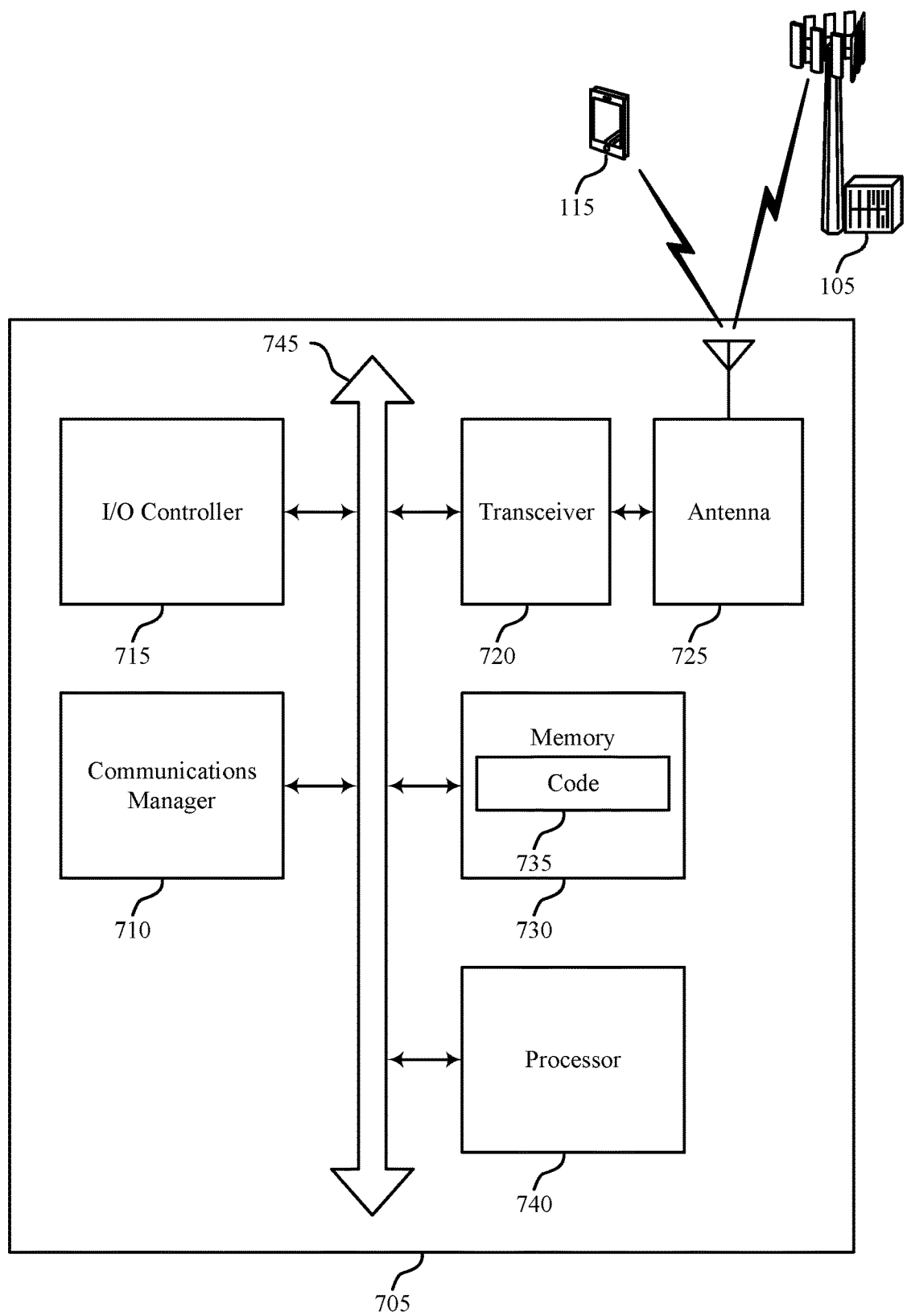
FIG. 7 shows a diagram of a system including a device that supports discontinuous reception signaling for wireless communications systems in accordance with aspects of the present disclosure.

FIG. 7 shows a diagram of a system 700 including a device 705 that supports discontinuous reception signaling for wireless communications systems in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a first SPS configuration from a base station, identify one or more DRX parameters of a first DRX configuration based on the first SPS configuration, where the first DRX configuration is associated with the first SPS configuration, and monitor a downlink control channel in accordance with the first DRX configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting DRX signaling for wireless communications systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
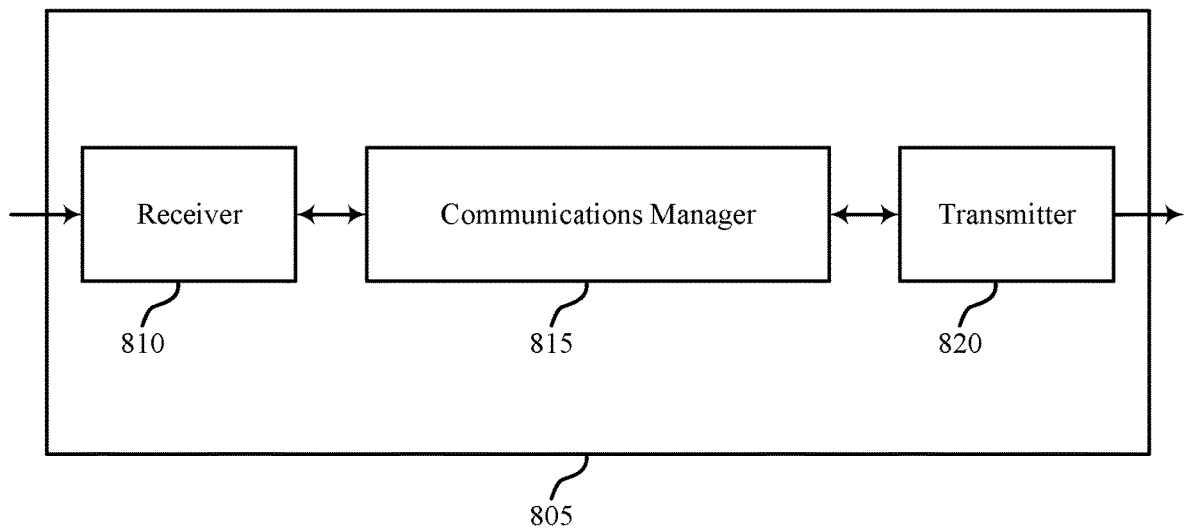
FIGS. 8 and 9 show block diagrams of devices that support discontinuous reception signaling for wireless communications systems in accordance with aspects of the present disclosure.

FIG. 8 shows a block diagram 800 of a device 805 that supports discontinuous reception signaling for wireless communications systems in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DRX signaling for wireless communications systems, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine a first SPS configuration for a UE, determine a first DRX configuration associated with the first SPS configuration, and transmit the first SPS configuration to the UE, the first SPS configuration being indicative of one or more DRX parameters of the first DRX configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
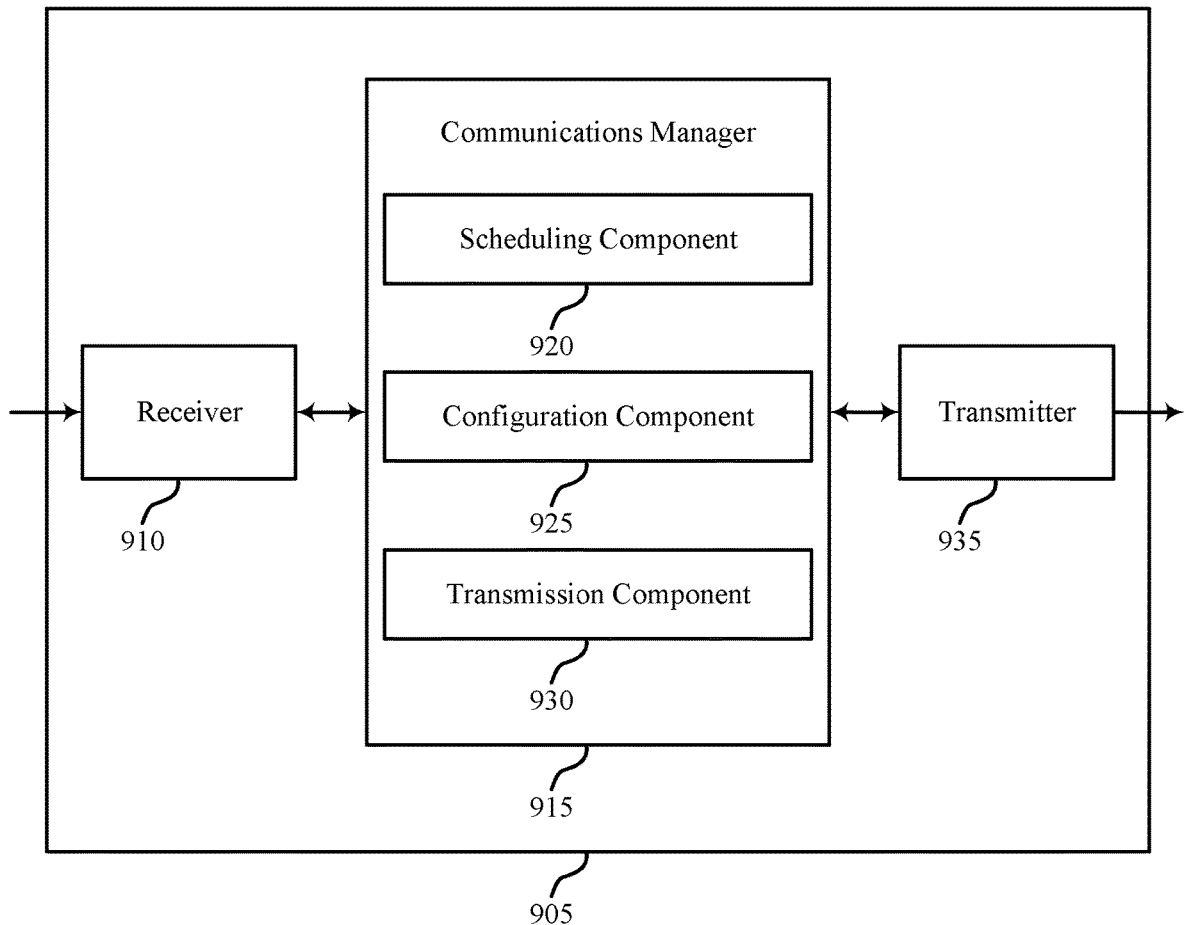

FIG. 9 shows a block diagram 900 of a device 905 that supports discontinuous reception signaling for wireless communications systems in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to DRX signaling for wireless communications systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a scheduling component 920, a configuration component 925, and a transmission component 930. The communications manager 915 may be an example of aspects of the communications manager 1110 described herein.

The scheduling component 920 may determine a first SPS configuration for a UE.

The configuration component 925 may determine a first DRX configuration associated with the first SPS configuration.

The transmission component 930 may transmit the first SPS configuration to the UE, the first SPS configuration being indicative of one or more DRX parameters of the first DRX configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
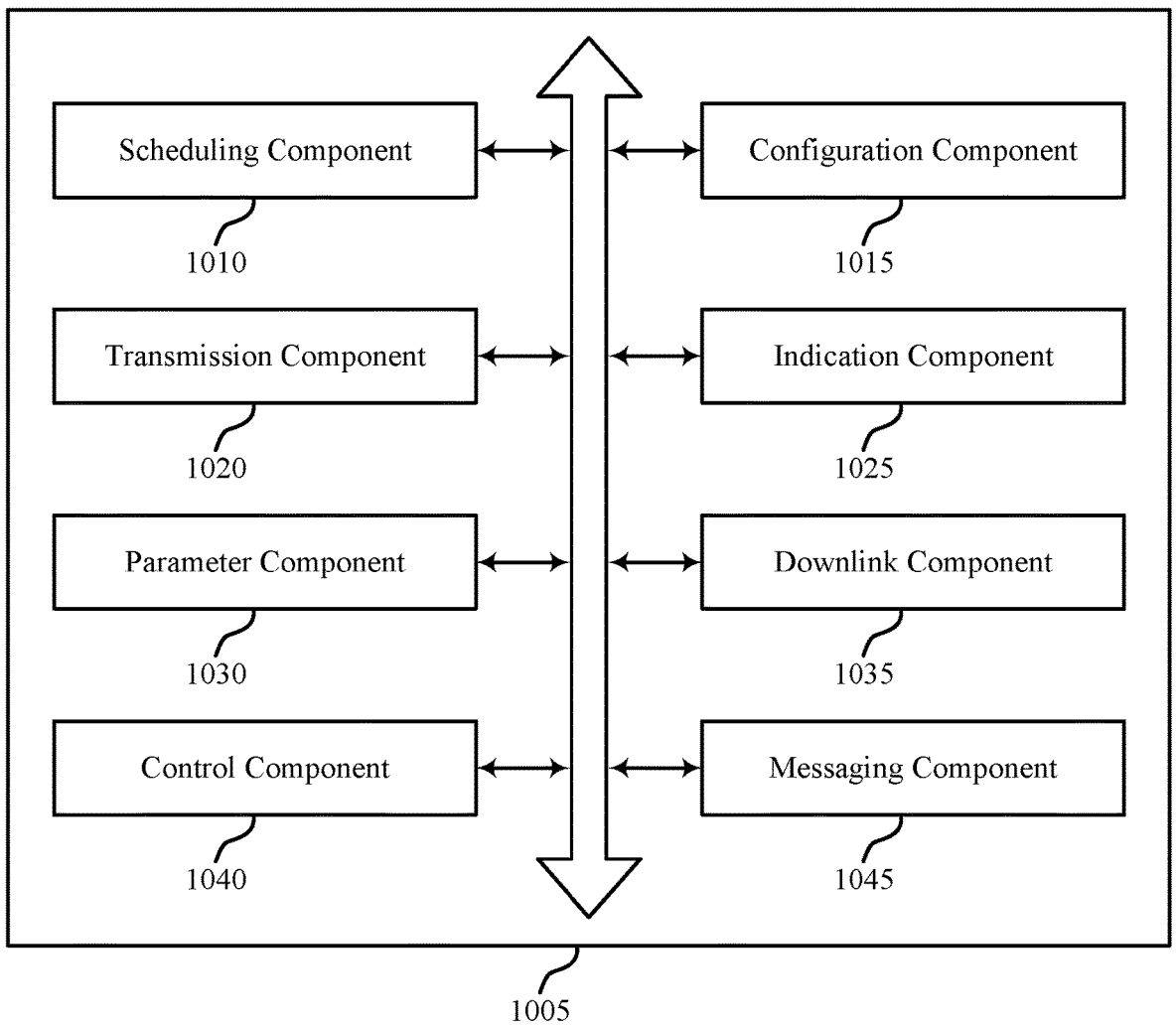
FIG. 10 shows a block diagram of a communications manager that supports discontinuous reception signaling for wireless communications systems in accordance with aspects of the present disclosure.

FIG. 10 shows a block diagram 1000 of a communications manager 1005 that supports discontinuous reception signaling for wireless communications systems in accordance with aspects of the present disclosure. The communications manager 1005 may be an example of aspects of a communications manager 815, a communications manager 915, or a communications manager 1110 described herein. The communications manager 1005 may include a scheduling component 1010, a configuration component 1015, a transmission component 1020, an indication component 1025, a parameter component 1030, a downlink component 1035, a control component 1040, and a messaging component 1045. Each of these modules may communicate, directly or indirectly, with one another (e.g., via one or more buses).

The scheduling component 1010 may determine a first SPS configuration for a UE. In some examples, the scheduling component 1010 may determine a second SPS configuration for the UE.

The configuration component 1015 may determine a first DRX configuration associated with the first SPS configuration. In some examples, the configuration component 1015 may determine a second DRX configuration associated with the second SPS configuration. In some cases, the one or more DRX parameters includes one or more offsets of the first DRX configuration, a duration of one or more active periods of the first DRX configuration, or a combination thereof.

The transmission component 1020 may transmit the first SPS configuration to the UE, the first SPS configuration being indicative of one or more DRX parameters of the first DRX configuration. In some examples, the transmission component 1020 may transmit the second SPS configuration to the UE, the second SPS configuration being indicative of one or more DRX parameters of the second DRX configuration.

The indication component 1025 may transmit an indication of the first DRX configuration jointly with the transmission of the first SPS configuration.

The parameter component 1030 may identify one or more SPS parameters of the first SPS configuration. In some cases, the one or more SPS parameters include a periodicity of the first SPS configuration, a starting time of the first SPS configuration, or both. In some cases, the one or more DRX parameters correspond to the one or more SPS parameters.

The downlink component 1035 may transmit, to the UE, downlink control information indicating the one or more DRX parameters. In some cases, the downlink control information includes the first SPS configuration.

The control component 1040 may transmit, to the UE, medium access control (MAC) control element signaling indicating the one or more DRX parameters.

The messaging component 1045 may transmit, to the UE, one or more messages via resource blocks associated with the first SPS configuration, where the resource blocks overlap with one or more active periods of the first DRX configuration.

Figure 11:
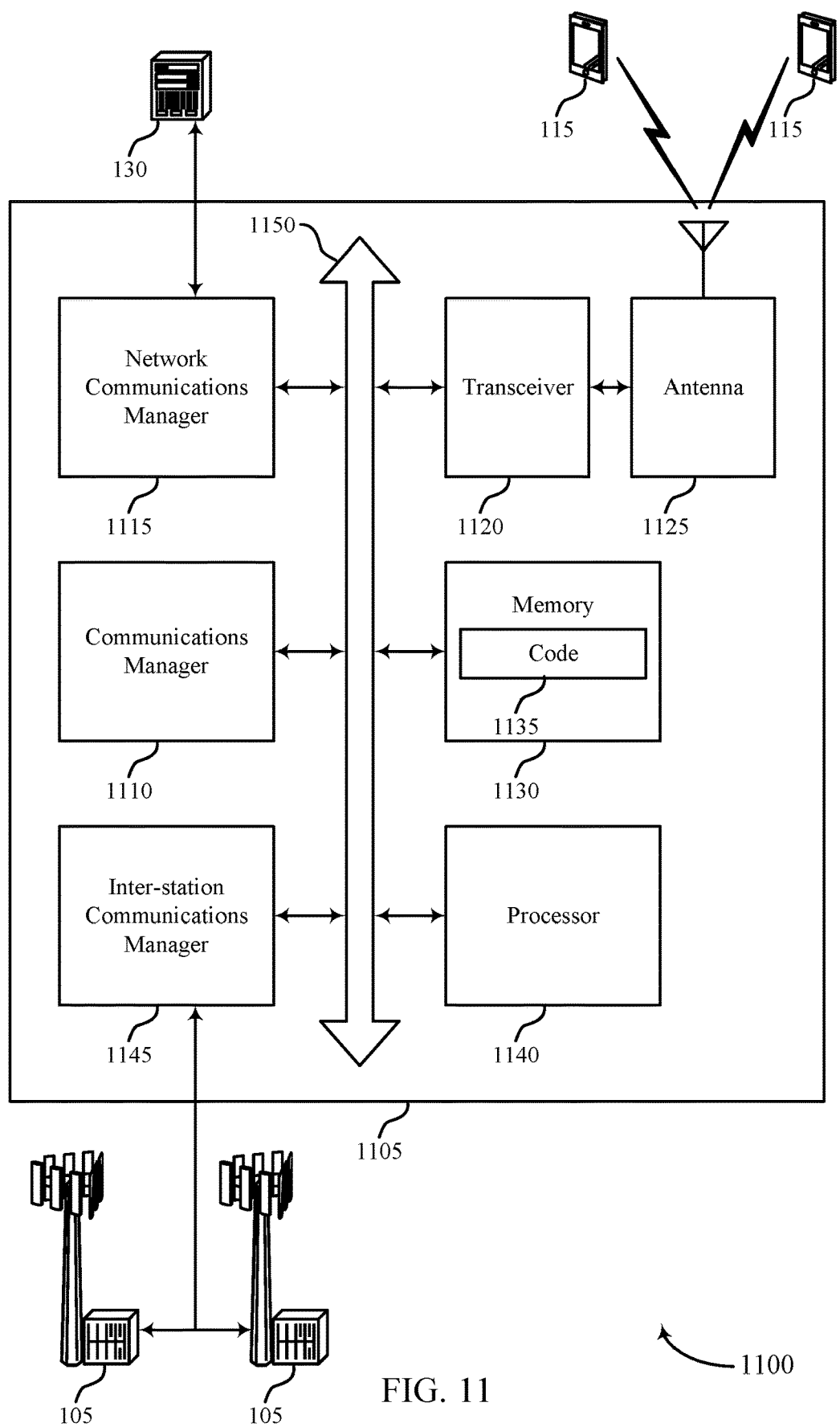
FIG. 11 shows a diagram of a system including a device that supports discontinuous reception signaling for wireless communications systems in accordance with aspects of the present disclosure.

FIG. 11 shows a diagram of a system 1100 including a device 1105 that supports discontinuous reception signaling for wireless communications systems in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine a first SPS configuration for a UE, determine a first DRX configuration associated with the first SPS configuration, and transmit the first SPS configuration to the UE, the first SPS configuration being indicative of one or more DRX parameters of the first DRX configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting DRX signaling for wireless communications systems).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
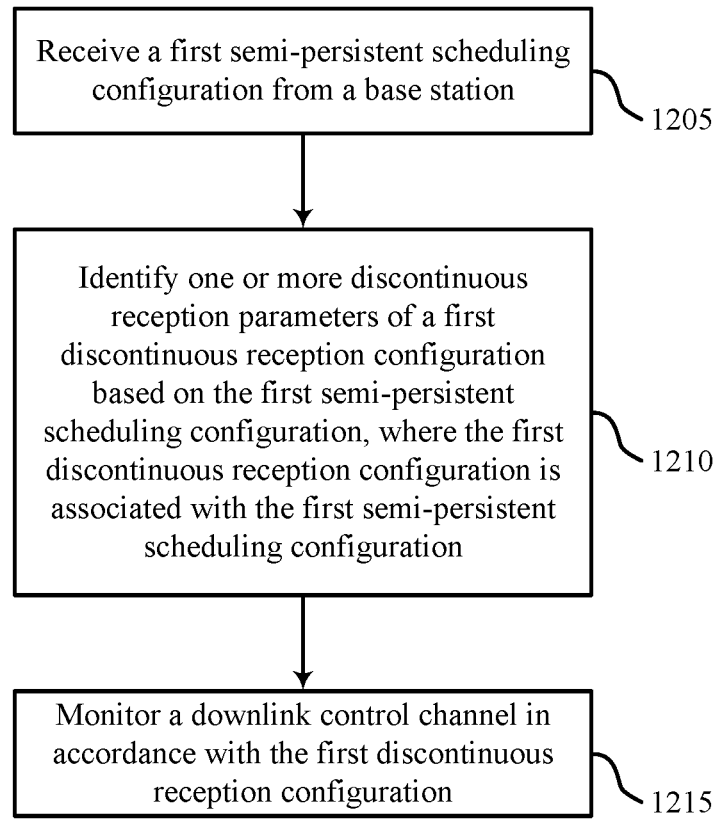
FIGS. 12 through 15 show flowcharts illustrating methods that support discontinuous reception signaling for wireless communications systems in accordance with aspects of the present disclosure.

FIG. 12 shows a flowchart illustrating a method 1200 that supports discontinuous reception signaling for wireless communications systems in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive a first SPS configuration from a base station. The operations of 1205 may be performed according to the methods described herein. In some examples, aspects of the operations of 1205 may be performed by a SPS component as described with reference to FIGS. 4 through 7.

At 1210, the UE may identify one or more DRX parameters of a first DRX configuration based on the first SPS configuration, where the first DRX configuration is associated with the first SPS configuration. The operations of 1210 may be performed according to the methods described herein. In some examples, aspects of the operations of 1210 may be performed by a DRX component as described with reference to FIGS. 4 through 7.

At 1215, the UE may monitor a downlink control channel in accordance with the first DRX configuration. The operations of 1215 may be performed according to the methods described herein. In some examples, aspects of the operations of 1215 may be performed by a monitoring component as described with reference to FIGS. 4 through 7.

Figure 13:
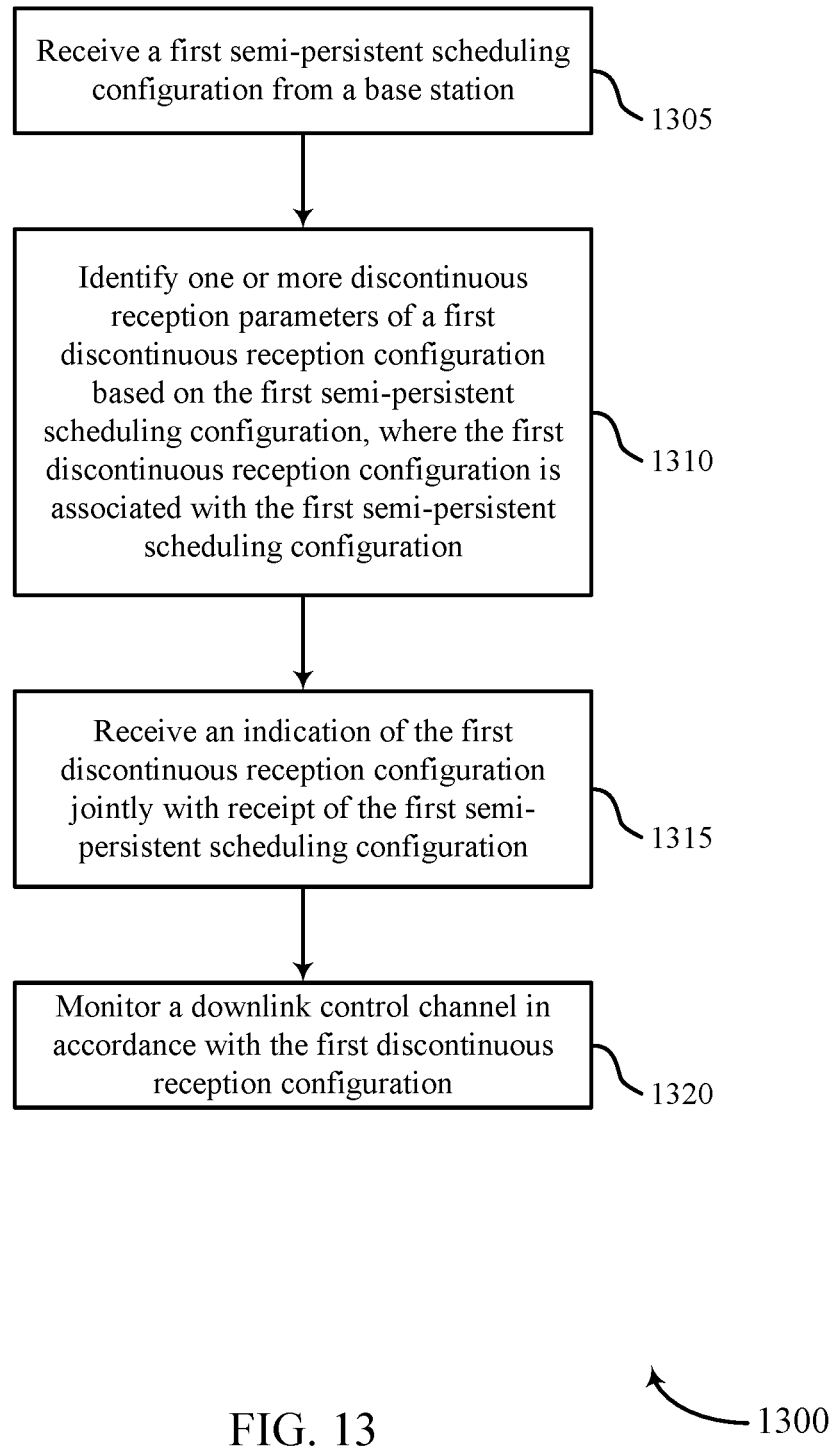

FIG. 13 shows a flowchart illustrating a method 1300 that supports discontinuous reception signaling for wireless communications systems in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive a first SPS configuration from a base station. The operations of 1305 may be performed according to the methods described herein. In some examples, aspects of the operations of 1305 may be performed by a SPS component as described with reference to FIGS. 4 through 7.

At 1310, the UE may identify one or more DRX parameters of a first DRX configuration based on the first SPS configuration, where the first DRX configuration is associated with the first SPS configuration. The operations of 1310 may be performed according to the methods described herein. In some examples, aspects of the operations of 1310 may be performed by a DRX component as described with reference to FIGS. 4 through 7.

At 1315, the UE may receive an indication of the first DRX configuration jointly with receipt of the first SPS configuration. The operations of 1315 may be performed according to the methods described herein. In some examples, aspects of the operations of 1315 may be performed by a DRX component as described with reference to FIGS. 4 through 7.

At 1320, the UE may monitor a downlink control channel in accordance with the first DRX configuration. The operations of 1320 may be performed according to the methods described herein. In some examples, aspects of the operations of 1320 may be performed by a monitoring component as described with reference to FIGS. 4 through 7.

Figure 14:
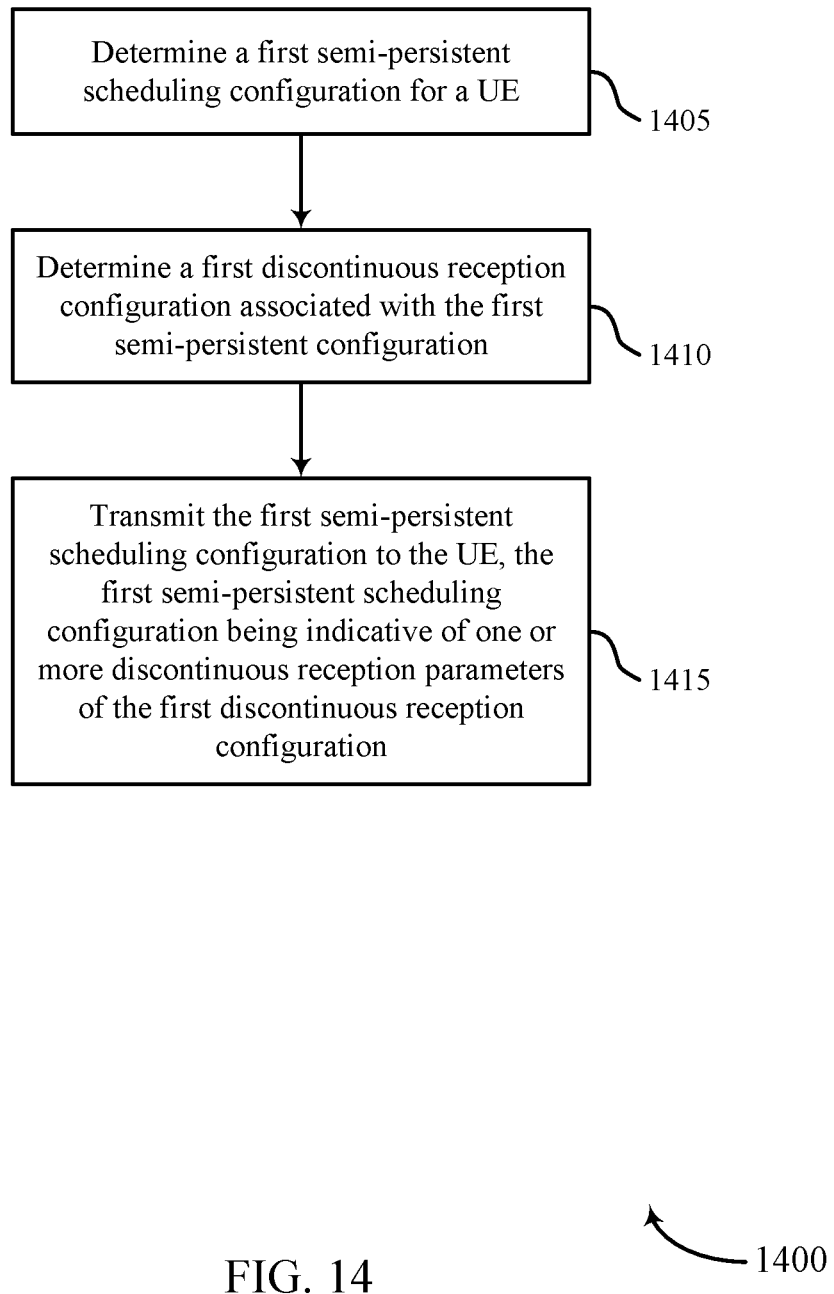

FIG. 14 shows a flowchart illustrating a method 1400 that supports discontinuous reception signaling for wireless communications systems in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may determine a first SPS configuration for a UE. The operations of 1405 may be performed according to the methods described herein. In some examples, aspects of the operations of 1405 may be performed by a scheduling component as described with reference to FIGS. 8 through 11.

At 1410, the base station may determine a first DRX configuration associated with the first SPS configuration. The operations of 1410 may be performed according to the methods described herein. In some examples, aspects of the operations of 1410 may be performed by a configuration component as described with reference to FIGS. 8 through 11.

At 1415, the base station may transmit the first SPS configuration to the UE, the first SPS configuration being indicative of one or more DRX parameters of the first DRX configuration. The operations of 1415 may be performed according to the methods described herein. In some examples, aspects of the operations of 1415 may be performed by a transmission component as described with reference to FIGS. 8 through 11.

Figure 15:
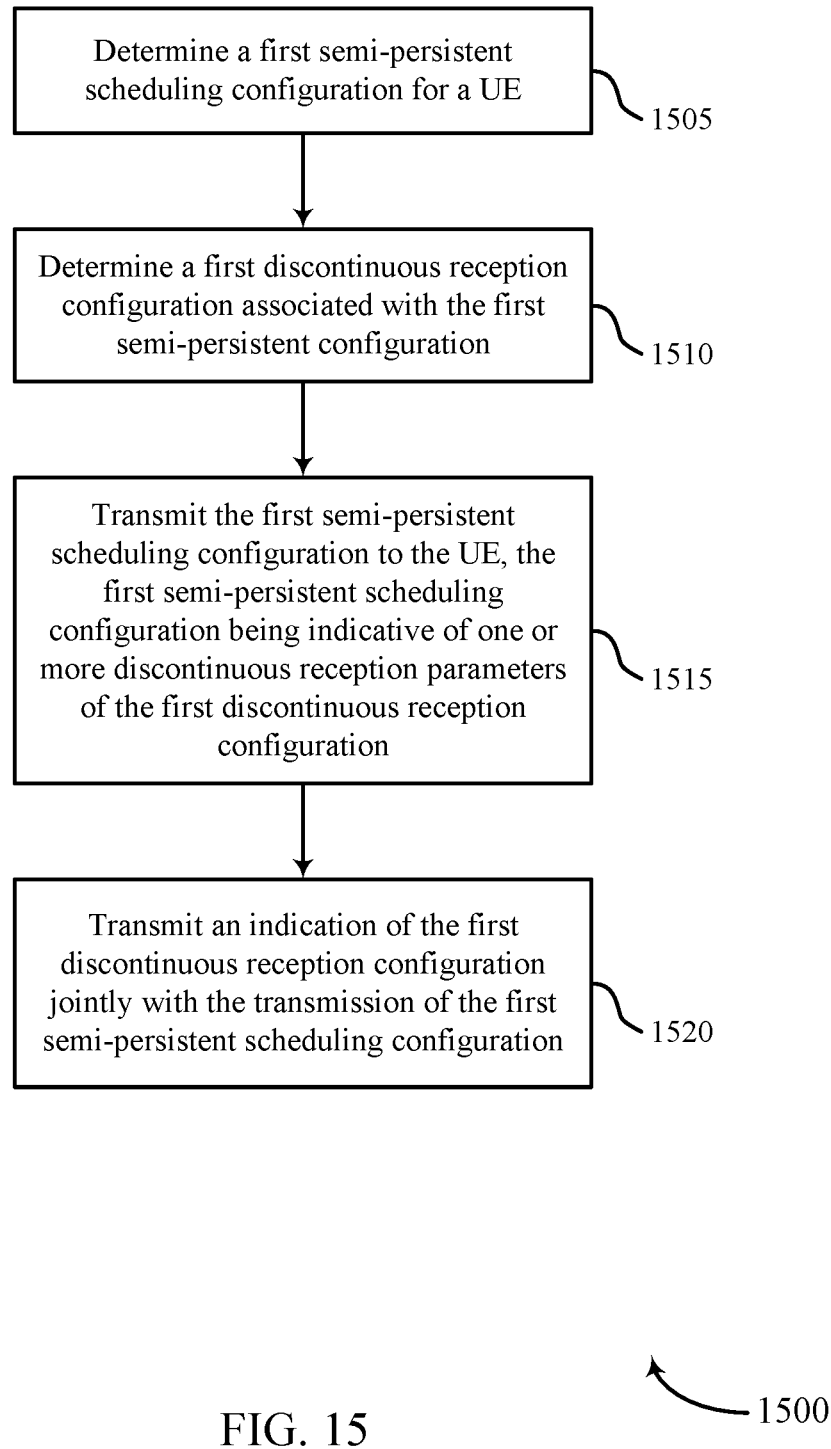

FIG. 15 shows a flowchart illustrating a method 1500 that supports discontinuous reception signaling for wireless communications systems in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may determine a first SPS configuration for a UE. The operations of 1505 may be performed according to the methods described herein. In some examples, aspects of the operations of 1505 may be performed by a scheduling component as described with reference to FIGS. 8 through 11.

At 1510, the base station may determine a first DRX configuration associated with the first SPS configuration. The operations of 1510 may be performed according to the methods described herein. In some examples, aspects of the operations of 1510 may be performed by a configuration component as described with reference to FIGS. 8 through 11.

At 1515, the base station may transmit the first SPS configuration to the UE, the first SPS configuration being indicative of one or more DRX parameters of the first DRX configuration. The operations of 1515 may be performed according to the methods described herein. In some examples, aspects of the operations of 1515 may be performed by a transmission component as described with reference to FIGS. 8 through 11.

At 1520, the base station may transmit an indication of the first DRX configuration jointly with the transmission of the first SPS configuration. The operations of 1520 may be performed according to the methods described herein. In some examples, aspects of the operations of 1520 may be performed by an indication component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a first semi-persistent scheduling configuration from a base station; identifying one or more discontinuous reception parameters of a first discontinuous reception configuration based at least in part on the first semi-persistent scheduling configuration, wherein the first discontinuous reception configuration is associated with the first semi-persistent scheduling configuration; and monitoring a downlink control channel in accordance with the first discontinuous reception configuration.

Aspect 2: The method of aspect 1, wherein identifying the one or more discontinuous reception parameters comprises: receiving an indication of the first discontinuous reception configuration jointly with receipt of the first semi-persistent scheduling configuration.

Aspect 3: The method of aspect 2, wherein identifying the one or more discontinuous reception parameters further comprises: determining a discontinuous reception configuration identifier, a discontinuous reception parameter group identifier, an association of a semi-persistent scheduling identifier with the discontinuous reception configuration identifier, or a combination thereof based at least in part on the indication of the first discontinuous reception configuration.

Aspect 4: The method of any of aspects 1 through 3, wherein identifying the one or more discontinuous reception parameters comprises: identifying one or more semi-persistent scheduling parameters of the first semi-persistent scheduling configuration; and determining, by the UE, the one or more discontinuous reception parameters of the first discontinuous reception configuration based at least in part on the one or more semi-persistent scheduling parameters.

Aspect 5: The method of aspect 4, wherein the one or more semi-persistent scheduling parameters comprises a periodicity of the first semi-persistent scheduling configuration, a starting time of the first semi-persistent scheduling configuration, or both.

Aspect 6: The method of any of aspects 1 through 5, wherein the one or more discontinuous reception parameters comprises one or more offsets of the first discontinuous reception configuration, a duration of one or more active periods of the first discontinuous reception configuration, or a combination thereof.

Aspect 7: The method of any of aspects 1 through 6, further comprising: receiving a second semi-persistent scheduling configuration from the base station; identifying one or more discontinuous reception parameters of a second discontinuous reception configuration based at least in part on the second semi-persistent scheduling configuration, wherein the second discontinuous reception configuration is associated with the second semi-persistent scheduling configuration; and monitoring the downlink control channel in accordance with the second discontinuous reception configuration.

Aspect 8: The method of any of aspects 1 through 7, wherein identifying the one or more discontinuous reception parameters comprises: receiving, from the base station, downlink control information indicating the one or more discontinuous reception parameters.

Aspect 9: The method of aspect 8, wherein the downlink control information comprises the first semi-persistent scheduling configuration.

Aspect 10: The method of any of aspects 1 through 9, wherein identifying the one or more discontinuous reception parameters comprises: receiving, from the base station, MAC control element signaling that indicates the one or more discontinuous reception parameters.

Aspect 11: The method of any of aspects 1 through 10, wherein the first discontinuous reception configuration comprises one or more active periods of the UE that overlap with one or more resource assignments of the first semi-persistent scheduling configuration.

Aspect 12: The method of any of aspects 1 through 11, wherein monitoring the downlink control channel in accordance with the first discontinuous reception configuration further comprises: monitoring the downlink control channel during one or more active periods of a cycle of the first discontinuous reception configuration; and entering a low power state after the one or more active periods of the cycle.

Aspect 13: A method for wireless communications at a base station, comprising: determining a first semi-persistent scheduling configuration for a UE; determining a first discontinuous reception configuration associated with the first semi-persistent scheduling configuration; and transmitting the first semi-persistent scheduling configuration to the UE, the first semi-persistent scheduling configuration being indicative of one or more discontinuous reception parameters of the first discontinuous reception configuration.

Aspect 14: The method of aspect 13, wherein transmitting the first semi-persistent scheduling configuration to the UE comprises: transmitting an indication of the first discontinuous reception configuration jointly with the transmission of the first semi-persistent scheduling configuration.

Aspect 15: The method of any of aspects 13 through 14, wherein the one or more discontinuous reception parameters comprises one or more offsets of the first discontinuous reception configuration, a duration of one or more active periods of the first discontinuous reception configuration, or a combination thereof.

Aspect 16: The method of any of aspects 13 through 15, further comprising: identifying one or more semi-persistent scheduling parameters of the first semi-persistent scheduling configuration.

Aspect 17: The method of aspect 16, wherein the one or more semi-persistent scheduling parameters comprise a periodicity of the first semi-persistent scheduling configuration, a starting time of the first semi-persistent scheduling configuration, or both.

Aspect 18: The method of any of aspects 16 through 17, wherein the one or more discontinuous reception parameters correspond to the one or more semi-persistent scheduling parameters.

Aspect 19: The method of any of aspects 13 through 18, further comprising: determining a second semi-persistent scheduling configuration for the UE; determining a second discontinuous reception configuration associated with the second semi-persistent scheduling configuration; and transmitting the second semi-persistent scheduling configuration to the UE, the second semi-persistent scheduling configuration being indicative of one or more discontinuous reception parameters of the second discontinuous reception configuration.

Aspect 20: The method of any of aspects 13 through 19, further comprising: transmitting, to the UE, downlink control information indicating the one or more discontinuous reception parameters.

Aspect 21: The method of aspect 20, wherein the downlink control information comprises the first semi-persistent scheduling configuration.

Aspect 22: The method of any of aspects 13 through 21, further comprising: transmitting, to the UE, MAC control element signaling indicating the one or more discontinuous reception parameters.

Aspect 23: The method of any of aspects 13 through 22, further comprising: transmitting, to the UE, one or more messages via resource blocks associated with the first semi-persistent scheduling configuration, wherein the resource blocks overlap with one or more active periods of the first discontinuous reception configuration.

Aspect 24: An apparatus for wireless communications at a UE, comprising a processor; memory coupled with the processor; and instructions stored in the memory and executable by the processor to cause the apparatus to perform a method of any of aspects 1 through 12.

Aspect 25: An apparatus for wireless communications at a UE, comprising at least one means for performing a method of any of aspects 1 through 12.

Aspect 26: A non-transitory computer-readable medium storing code for wireless communications at a UE, the code comprising instructions executable by a processor to perform a method of any of aspects 1 through 12.

Aspect 27: An apparatus for wireless communications at a base station, comprising a processor; memory coupled with the processor; and instructions stored in the memory and executable by the processor to cause the apparatus to perform a method of any of aspects 13 through 23.

Aspect 28: An apparatus for wireless communications at a base station, comprising at least one means for performing a method of any of aspects 13 through 23.

Aspect 29: A non-transitory computer-readable medium storing code for wireless communications at a base station, the code comprising instructions executable by a processor to perform a method of any of aspects 13 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a network device, an indication of a mapping between a plurality of semi-persistent scheduling configurations and a plurality of respective discontinuous reception configurations;
receiving an indication of a first semi-persistent scheduling configuration from the network device, wherein the plurality of semi-persistent scheduling configurations includes the first semi-persistent scheduling configuration;
identifying one or more discontinuous reception parameters of a first discontinuous reception configuration based at least in part on the indication of the first semi-persistent scheduling configuration and based at least in part on the mapping, wherein the first discontinuous reception configuration is associated with the first semi-persistent scheduling configuration; and
monitoring a downlink control channel in accordance with the first discontinuous reception configuration.

2. The method of claim 1, wherein identifying the one or more discontinuous reception parameters comprises:
receiving an indication of the first discontinuous reception configuration jointly with receipt of the first semi-persistent scheduling configuration.

3. The method of claim 2, wherein identifying the one or more discontinuous reception parameters further comprises:
determining a discontinuous reception configuration identifier, a discontinuous reception parameter group identifier, an association of a semi-persistent scheduling identifier with the discontinuous reception configuration identifier, or a combination thereof based at least in part on the indication of the first discontinuous reception configuration.

4. The method of claim 1, wherein identifying the one or more discontinuous reception parameters comprises:
identifying one or more semi-persistent scheduling parameters of the first semi-persistent scheduling configuration; and
determining, by the UE, the one or more discontinuous reception parameters of the first discontinuous reception configuration based at least in part on the one or more semi-persistent scheduling parameters.

5. The method of claim 4, wherein the one or more semi-persistent scheduling parameters comprises a periodicity of the first semi-persistent scheduling configuration, a starting time of the first semi-persistent scheduling configuration, or both.

6. The method of claim 1, wherein the one or more discontinuous reception parameters comprises one or more offsets of the first discontinuous reception configuration, a duration of one or more active periods of the first discontinuous reception configuration, or a combination thereof.

7. The method of claim 1, further comprising:
receiving an indication of a second semi-persistent scheduling configuration from the network device, wherein the plurality of semi-persistent scheduling configurations includes the second semi-persistent scheduling configuration;
identifying one or more discontinuous reception parameters of a second discontinuous reception configuration based at least in part on the indication of the second semi-persistent scheduling configuration and based at least in part on the mapping, wherein the second discontinuous reception configuration is associated with the second semi-persistent scheduling configuration; and
monitoring the downlink control channel in accordance with the second discontinuous reception configuration.

8. The method of claim 1, wherein receiving the indication of the first semi-persistent scheduling configuration comprises:
receiving, from the network device, downlink control information indicating the first semi-persistent scheduling configuration.

9. The method of claim 1, wherein receiving the indication of the first semi-persistent scheduling configuration comprises:
receiving, from the network device, medium access control (MAC) control element signaling that indicates the first semi-persistent scheduling configuration.

10. The method of claim 1, wherein the first discontinuous reception configuration comprises one or more active periods of the UE that overlap with one or more resource assignments of the first semi-persistent scheduling configuration.

11. The method of claim 1, wherein monitoring the downlink control channel in accordance with the first discontinuous reception configuration further comprises:
monitoring the downlink control channel during one or more active periods of a cycle of the first discontinuous reception configuration; and
entering a low power state after the one or more active periods of the cycle.

12. A method for wireless communications at a network device, comprising:
determining a first semi-persistent scheduling configuration for a user equipment (UE);
determining a first discontinuous reception configuration associated with the first semi-persistent scheduling configuration;
transmitting, to the UE, an indication of a mapping between a plurality of semi-persistent scheduling configurations and a plurality of respective discontinuous reception configurations, wherein the plurality of semi-persistent scheduling configurations includes the first semi-persistent scheduling configuration; and
transmitting an indication of the first semi-persistent scheduling configuration to the UE, the first semi-persistent scheduling configuration being indicative of one or more discontinuous reception parameters of the first discontinuous reception configuration based at least in part on the mapping and based at least in part on the indication of the first semi-persistent scheduling configuration.

13. The method of claim 12, wherein transmitting the first semi-persistent scheduling configuration to the UE comprises:

transmitting an indication of the first discontinuous reception configuration jointly with transmission of the first semi-persistent scheduling configuration.

14. The method of claim 12, wherein the one or more discontinuous reception parameters comprises one or more offsets of the first discontinuous reception configuration, a duration of one or more active periods of the first discontinuous reception configuration, or a combination thereof.

15. The method of claim 12, further comprising:
identifying one or more semi-persistent scheduling parameters of the first semi-persistent scheduling configuration.

16. The method of claim 15, wherein the one or more semi-persistent scheduling parameters comprise a periodicity of the first semi-persistent scheduling configuration, a starting time of the first semi-persistent scheduling configuration, or both.

17. The method of claim 15, wherein the one or more discontinuous reception parameters correspond to the one or more semi-persistent scheduling parameters.

18. The method of claim 12, further comprising:
determining a second semi-persistent scheduling configuration for the UE, wherein the plurality of semi-persistent scheduling configurations includes the second semi-persistent scheduling configuration;
determining a second discontinuous reception configuration associated with the second semi-persistent scheduling configuration; and
transmitting the second semi-persistent scheduling configuration to the UE, the second semi-persistent scheduling configuration being indicative of one or more discontinuous reception parameters of the second discontinuous reception configuration based at least in part on the mapping and based at least in part on the indication of the second semi-persistent scheduling configuration.

19. The method of claim 12, wherein transmitting the indication of the first semi-persistent scheduling configuration comprises:
transmitting, to the UE, downlink control information indicating the first semi-persistent scheduling configuration.

20. The method of claim 12, wherein transmitting the indication of the first semi-persistent scheduling configuration comprises:
transmitting, to the UE, medium access control (MAC) control element signaling indicating the first semi-persistent scheduling configuration.

21. The method of claim 12, further comprising:
transmitting, to the UE, one or more messages via resource blocks associated with the first semi-persistent scheduling configuration, wherein the resource blocks overlap with one or more active periods of the first discontinuous reception configuration.

22. An apparatus for wireless communications at a user equipment (UE), comprising:
one or more processors;
memory coupled with the one or more processors; and
instructions stored in the memory and executable by the one or more processors to cause the apparatus to:
receive, from a network device, an indication of a mapping between a plurality of semi-persistent scheduling configurations and a plurality of respective discontinuous reception configurations;
receive an indication of a first semi-persistent scheduling configuration from the network device, wherein the plurality of semi-persistent scheduling configurations includes the first semi-persistent scheduling configuration;
identify one or more discontinuous reception parameters of a first discontinuous reception configuration based at least in part on the indication of the first semi-persistent scheduling configuration and based at least in part on the mapping, wherein the first discontinuous reception configuration is associated with the first semi-persistent scheduling configuration; and
monitor a downlink control channel in accordance with the first discontinuous reception configuration.

23. The apparatus of claim 22, wherein the instructions to identify the one or more discontinuous reception parameters are executable by the one or more processors to cause the apparatus to:
receive an indication of the first discontinuous reception configuration jointly with receipt of the first semi-persistent scheduling configuration.

24. The apparatus of claim 23, wherein the instructions to identify the one or more discontinuous reception parameters further are executable by the one or more processors to cause the apparatus to:
determine a discontinuous reception configuration identifier, a discontinuous reception parameter group identifier, an association of a semi-persistent scheduling identifier with the discontinuous reception configuration identifier, or a combination thereof based at least in part on the indication of the first discontinuous reception configuration.

25. The apparatus of claim 22, wherein the first discontinuous reception configuration comprises one or more active periods of the UE that overlap with one or more resource assignments of the first semi-persistent scheduling configuration.

26. An apparatus for wireless communications at a network device, comprising:
one or more processors;
memory coupled with the one or more processors; and
instructions stored in the memory and executable by the one or more processors to cause the apparatus to:
determine a first semi-persistent scheduling configuration for a user equipment (UE);
determine a first discontinuous reception configuration associated with the first semi-persistent scheduling configuration;
transmit, to the UE, an indication of a mapping between a plurality of semi-persistent scheduling configurations and a plurality of respective discontinuous reception configurations, wherein the plurality of semi-persistent scheduling configurations includes the first semi-persistent scheduling configuration; and
transmit an indication of the first semi-persistent scheduling configuration to the UE, the first semi-persistent scheduling configuration being indicative of one or more discontinuous reception parameters of the first discontinuous reception configuration based at least in part on the mapping and based at least in part on the indication of the first semi-persistent scheduling configuration.

27. The apparatus of claim 26, wherein the instructions to transmit the first semi-persistent scheduling configuration to the UE are executable by the one or more processors to cause the apparatus to:

transmit an indication of the first discontinuous reception configuration jointly with transmission of the first semi-persistent scheduling configuration.

28. The apparatus of claim 26, wherein the one or more discontinuous reception parameters comprises one or more offsets of the first discontinuous reception configuration, a duration of one or more active periods of the first discontinuous reception configuration, or a combination thereof.

29. The apparatus of claim 26, wherein the instructions are further executable by the one or more processors to cause the apparatus to:
identify one or more semi-persistent scheduling parameters of the first semi-persistent scheduling configuration.

30. The apparatus of claim 26, wherein the instructions are further executable by the one or more processors to cause the apparatus to:
transmit, to the UE, one or more messages via resource blocks associated with the first semi-persistent scheduling configuration, wherein the resource blocks overlap with one or more active periods of the first discontinuous reception configuration.

* * * * *